United States Patent
Suzuki et al.

(10) Patent No.: US 11,762,389 B2
(45) Date of Patent: Sep. 19, 2023

(54) TRANSPORT SYSTEM, TRANSPORT ROBOT, CONTROL APPARATUS, CONTROL METHOD, AND PROGRAM

(71) Applicant: NEC Corporation, Tokyo (JP)

(72) Inventors: Takayuki Suzuki, Tokyo (JP); Taichi Kumagai, Tokyo (JP); Hiroshi Yoshida, Tokyo (JP)

(73) Assignee: NEC CORPORATION, Tokyo (JP)

(*) Notice: Subject to any disclaimer, the term of this patent is extended or adjusted under 35 U.S.C. 154(b) by 365 days.

(21) Appl. No.: 17/274,570

(22) PCT Filed: Sep. 9, 2019

(86) PCT No.: PCT/JP2019/035313
§ 371 (c)(1),
(2) Date: Mar. 9, 2021

(87) PCT Pub. No.: WO2020/054645
PCT Pub. Date: Mar. 19, 2020

(65) Prior Publication Data
US 2022/0050464 A1    Feb. 17, 2022

(30) Foreign Application Priority Data
Sep. 10, 2018    (JP) .................. 2018-168684

(51) Int. Cl.
*B25J 19/02* (2006.01)
*G05D 1/02* (2020.01)
*B60K 1/02* (2006.01)

(52) U.S. Cl.
CPC ......... *G05D 1/0212* (2013.01); *G05D 1/0287* (2013.01); *B60K 1/02* (2013.01); *G05D 2201/0216* (2013.01)

(58) Field of Classification Search
CPC ....... B25J 5/00; B25J 9/16; B60P 3/40; Y10S 901/01; B60K 1/02; G05D 1/0212; G05D 1/0287; G05D 2201/0216; G05D 1/0293
(Continued)

(56) References Cited

U.S. PATENT DOCUMENTS 9,707,879 B2 * 7/2017 Mecklinger ............. B66F 9/063
2007/0140821 A1 * 6/2007 Garon .................... B25J 9/0084
414/730

(Continued)

FOREIGN PATENT DOCUMENTS

JP    S56-142987 U    3/1980
JP    H08-123551 A    5/1996
(Continued)

OTHER PUBLICATIONS

Japanese Office Action for JP Application No. 2020-546001, dated Feb. 7, 2023 with English Translation.
(Continued)

*Primary Examiner* — Dalena Tran
(74) *Attorney, Agent, or Firm* — Sughrue Mion, PLLC

(57) ABSTRACT

A transport system that transports a transport object in a state sandwiching the transport object between two transport robots, wherein the transport robot comprises: a main body; wheels; a drive part(s); a contact part; and a rotation mechanism, and wherein using hardware resources, the following processings are executed, the following processings comprising: predicting an orbit of a first transport robot arranged in front of the transport object; and predicting an orbit of a second transport robot so that the second transport robot pushes the transport object from outside of the orbit of the first transport robot in a curve based on the predicted orbit of the first transport robot, the second transport robot arranged behind the transport object.

20 Claims, 29 Drawing Sheets

(58) Field of Classification Search
USPC ........ 701/25; 198/750.11; 294/907; 414/543, 414/730
See application file for complete search history.

(56) References Cited

U.S. PATENT DOCUMENTS

| | | | |
|---|---|---|---|
| 2011/0166703 A1* | 7/2011 | Byrne | B25J 9/1682 901/50 |
| 2013/0245823 A1* | 9/2013 | Kimura | B25J 9/1682 294/213 |
| 2014/0303814 A1* | 10/2014 | Burema | A01C 21/00 901/1 |
| 2015/0142249 A1 | 5/2015 | Ooga et al. | |

FOREIGN PATENT DOCUMENTS

| | | |
|---|---|---|
| JP | 2000-042958 A | 2/2000 |
| JP | 2000-203799 A | 7/2000 |
| JP | 2001-213597 A | 8/2001 |
| JP | 2004-337918 A | 12/2004 |
| JP | 2006-027343 A | 2/2006 |
| JP | 2007-111826 A | 5/2007 |
| JP | 2009-006415 A | 1/2009 |
| JP | 5588714 B2 | 9/2014 |
| JP | 2015-099524 A | 5/2015 |
| JP | 6151159 B2 | 6/2017 |
| WO | 2016/192857 A2 | 12/2016 |

OTHER PUBLICATIONS

JP Office Action for JP Application No. 2020-546001, dated Sep. 13, 2022 with English Translation.
International Search Report for PCT Application No. PCT/JP2019/035313, dated Nov. 19, 2019.
Hiroaki Yamaguchi et al., "Control of a Five-axle, Three-steering Coupled-vehicle System", Transactions of the Society of Instrument and Control Engineers, Jun. 2010, vol. 46, No. 6, pp. 317-325, in particular, sections 1-8, fig. 1-3, Japan.
Yasuhisa Hirata et al., "Transportation of an Object with Unknown Shape by Multiple Mobile Robots in Coordination", Preprints of the 18th Academic Lecture Conference of the Robotics Society of Japan, Sep. 12, 2000, vol. 3, pp. 1025-1026, 3C15, in particular, "4 Cooperative Transportation", fig. 3, non-official translation, Japan.

* cited by examiner

TRANSPORT SYSTEM, TRANSPORT ROBOT, CONTROL APPARATUS, CONTROL METHOD, AND PROGRAM

DESCRIPTION OF RELATED APPLICATION

This application is a National Stage Entry of PCT/JP2019/035313 filed on Sep. 9, 2019, which claims priority from Japanese Patent Application 2018-168684 filed on Sep. 10, 2018, the contents of all of which are incorporated herein by reference, in their entirety.

FIELD

The present invention relates to a transport system, a transport robot, a control apparatus, a control method, and a program.

BACKGROUND

The present invention relates to a transport system, a transport robot, a control apparatus, a control method, and a program.

BACKGROUND

There are the following transport systems that transport a transport object by causing a plurality of transport robots to collaborate (coordinate).

For example, transport systems of Patent Literatures (PTLs) 1 and 2 are configured to transport a transport object by installing a turntable (positional error absorption mechanism) in each of a plurality of transport robots, and arranging a transport robot (freight) so as to straddle the plurality of turntables.

Also, a transport system of PTL 3 is configured to transport a transport object by providing an arm and a hand for each of a plurality of transport robots, and rotatably supporting the transport object from below by a plurality of hands.

Further, a transport system of PTL 4 is configured to transport a transport object by providing a robot arm and a hook for each of a plurality of transport robots, and lifting the transport object by a plurality of hooks.

Furthermore, a transport system of PTL 5 is configured to transport a transport object by providing a movable arm and a plurality of grip mechanisms for each of a plurality of transport robots, and gripping the transport object due to the plurality of grip mechanisms.

[PTL 1] JP6151159B
[PTL 2] JP5588714B
[PTL 3] JP2000-42958A
[PTL 4] JP2007-111826A
[PTL 5] JP2009-6415A

SUMMARY

The following analysis is given by the inventors of the present application.

In the transport system of PTLs 1 and 2, a manual or a reloading robot for reloading a transport object on the turntable is required. Also, in a logistics business (transportation business), in order to make it easy to move, a freight is often carried on a trolley (including a dolly). However, in the transport system of PTLs 1 and 2, the dolly cannot be transported in a state that the freight is placed on the trolley.

Also, in the transport system of PTL 3, it is necessary to provide a support rod on the transport object so that the transport object can be supported by the hand, and it is not possible to transport the transport object without a support rod.

Further, in the transport system of PTL 4, it is necessary to attach an eyebolt to the transport object so that the transport object can be hung by the hook, and it is not possible to transport the transport object to which an eyebolt cannot be attached.

Furthermore, in the transport system of PTL 5, it is necessary to provide a grip part on the transport object so that the transport object can be gripped by a grip mechanism, and it is not possible to transport the transport object without the grip part.

In a logistics business, although carts of various types (shape, size, etc.) are used depending on a shipper, etc., it is desired that a cart (transport object) on which a freight is placed can be stably transported as it is without modifying the transport object.

It is a main object of the present invention to provide a transport system, a transport robot, a control apparatus, a control method and a program which can contribute to stable transportation of various types of transport object without modifying the transport object and without reloading the transport object.

A transport system according to a first aspect is a transport system that transports a transport object in a state sandwiching the transport object between two transport robots. The transport robot comprises: a main body; wheels; a drive part(s) mounted on the main body and configured to drive the wheels; a contact part that contacts with the transport object; and a rotation mechanism that makes the contact part rotatable relative to the main body. In the transport system, using hardware resources, the following processings are executed, the processings comprising: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

A transport robot according to a second aspect is a transport robot configured to transport a transport object while sandwiching the transport object by cooperating with another transport robot. The transport robot comprises: a main body; wheels; a drive part(s) mounted on the main body and configured to drive the wheels; a contact part that contacts the transport object; a rotation mechanism that makes the contact part rotatable relative to the main body; and a control part that controls the drive part(s). The control part executes: predicting an orbit of a first transport robot of the two transport robots, the first transport robot being arranged so that the contact part contacts a front of the transport object in a traveling direction at the time of transportation, and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

A control apparatus according to a third aspect is a control apparatus that controls two transport robots adapted to sandwich a transport object in cooperation with each other to transport the transport object. The transport robot comprises: a main body; wheels; a drive part(s) mounted on the main body and configured to drive the wheels; a contact part that contacts the transport object; and a rotation mechanism that makes the contact part rotatable relative to the main body. The control apparatus executes: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

A control method of transport robots according to a fourth aspect is a control method of transport robots that controls two transport robots adapted to sandwich a transport object in cooperation with each other to transport the transport object. The transport robot comprises: a main body; wheels; a drive part(s) mounted on the main body and configured to drive the wheels; a contact part that contacts the transport object; and a rotation mechanism that makes the contact part rotatable relative to the main body. The control method of the transport robot comprises: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation. Each of the processings is executed using hardware resources.

A program according to a fifth aspect is a program executed by a control apparatus that controls two transport robots that sandwich a transport object in cooperation with each other to transport the transport object. The transport robot comprises: a main body; wheels; a drive part(s) mounted on the main body and configured to drive the wheels; a contact part that contacts the transport object; and a rotation mechanism that makes the contact part rotatable relative to the main body. The program causes the control apparatus to execute processings of: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in the curve, based on the predicted orbit of the first transport robot, the second transport robot being arranged so that the contact part contacts a rear of the transport object in a traveling direction at the time of transportation.

A program according to a sixth aspect is a program executed by a control apparatus that controls two transport robots that sandwich a transport object in cooperation with each other to transport the transport object. The transport robot comprises: a main body; wheels; a drive part(s) mounted on the main body and configured to drive the wheels; a contact part that contacts the transport object; and a rotation mechanism that makes the contact part rotatable relative to the main body. The program causes the control apparatus to execute processings of:

predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in the curve, based on the predicted orbit of the first transport robot, the second transport robot being arranged so that the contact part contacts a rear of the transport object in a traveling direction at the time of transportation.

The program can be recorded on a computer-readable storage medium. The storage medium may be a non-transient such as a semiconductor memory, a hard disk, a magnetic recording medium, or an optical recording medium. Also, in the present disclosure, it is also possible to implement it as a computer program product. The program is input to a computer apparatus from an input device or from outside via a communication interface; is stored in a storage device; causes a processor to drive according to predetermined steps or processings; can cause to display processing results thereof, including an intermediate state via a display device step by step as necessary; or can cause to communicate with outside via a communication interface. The computer apparatus for that purpose typically comprises: for example, a processor; a storage device; an input device; a communication interface; and, if necessary, a display device, that can be connected to each other via a bus.

According to the first to sixth aspects, it is possible to contribute to stable transportation of various types of transport object as it is without modifying the transport object and without reloading the transport object.

PREFERRED MODES

Figure 1:
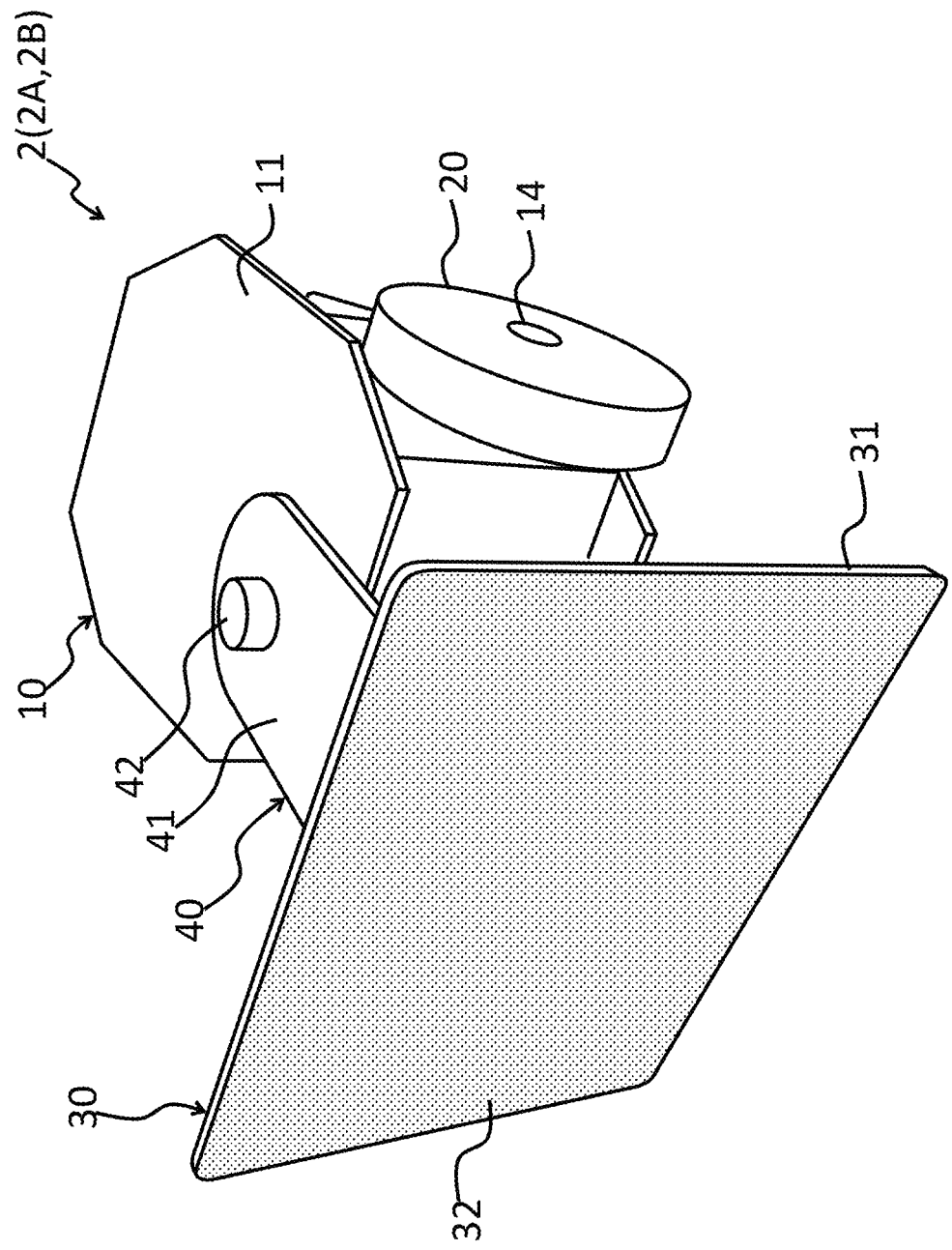
FIG. 1 is an external perspective view schematically showing a configuration of a transport robot in a transport system according to a first exemplary embodiment.

In the present disclosure described below, a transport system according to mode 1 and its modified mode(s) can be appropriately selected and combined.

As the transport system according to the mode 1, the transport system may be a transport system that transports a transport object in a state sandwiching the transport object between two transport robots. The transport robot may comprise: a main body; wheels; a drive part(s) mounted on the main body and configured to drive the wheels; a contact part that contacts the transport object; and a rotation mechanism that makes the contact part rotatable relative to the main body. The transport system may execute the following processings using hardware resources, the processings comprising: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

As a modification mode of the transport system according to the mode 1, the predicting the orbit of the second transport robot may comprise predicting the orbit of the second transport robot when moving toward a position directly behind the first transport robot after a plurality of arbitrary time periods from a time point of a current location have elapsed, and using the hardware resources, after the predicting the orbit of the second transport robot, the following processings may be executed, the following processings comprising: calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and controlling the drive part(s) of the second transport robot based on the calculated orbit of the second transport robot.

As a modification mode of the transport system according to the mode 1, using the hardware resources, after predicting the orbit of the second transport robot, the following processings may be executed: calculating maximum values of a relative angle in traveling directions between the first transport robot and the second transport robot for each of the arbitrary time periods based on the predicted orbit of the first transport robot and the predicted orbit of the second transport robot; and determining a time period at which the maximum value of the calculated relative angle becomes a minimum, or a shortest time period becoming a preset threshold value or less, among the arbitrary time periods, and the calculating the orbit of the second transport robot may comprise calculating an orbit of the second transport robot when the second transport robot moves toward a position directly behind the first transport robot after the determined time period is passed from the time point of the current location, while pushing the transport object from outside of the orbit of the first transport robot in a curve, based on the predicted orbit of the first transport robot and the determined time period.

As a modification mode of the transport system according to the mode 1, the position directly behind the first transport robot may be a position on a virtual line in a traveling direction of the first transport robot passing through a center-of-gravity of the first transport robot.

As a modification mode of the transport system according to the mode 1, the arbitrary time period may be a plurality of times with a predetermined time period difference, and may be a time period or less when the maximum value of the calculated relative angle is minimal, or a shortest time period or less when the maximum value of the calculated relative angle is a threshold value set in advance or less.

As a modification mode of the transport system according to the mode 1, the second transport robot may further comprise a control part that executes each of the processings as the hardware resources.

As a modification mode of the transport system according to the mode 1, the control part may execute acquiring information of a current location, a direction of the first transport robot and a control amount(s) of the drive part(s) of the first transport robot from the first transport robot, and the predicting the orbit of the first transport robot may comprise predicting the orbit of the first transport robot based on the current location and the direction of the first transport robot and the control amount(s) of the drive part(s) of the first transport robot as acquired.

As a modification mode of the transport system according to the mode 1, the transport system may further comprise a control apparatus that controls the first transport robot and the second transport robot as the hardware resources, and the control apparatus may execute each of the processings.

As a modification mode of the transport system according to the mode 1, the transport system may further comprise a robot position acquisition apparatus that acquires information of positions of the first transport robot and the second transport robot; the control apparatus may acquire information of a current location and a direction of the first transport robot from the robot position acquisition apparatus, and acquires information of a control amount(s) of the drive part(s) of the first transport robot calculated by itself; and the predicting the orbit of the first transport robot may comprise predicting the orbit of the first transport robot based on the current location and the direction of the first transport robot and the control amount(s) of the drive part(s) of the first transport robot, as acquired.

As a modification mode of the transport system according to the mode 1, in controlling the drive part(s) of the second transport robot, the drive part(s) of the second transport robot may be controlled so that the second transport robot moves while pushing the first robot together with the transport object.

As a modification mode of the transport system according to the mode 1, each of the processings may start when the first transport robot arrives at or just before a curve entrance, and may end when the second transport robot arrives at or just after a curve exit.

In the present disclosure, as a transport robot according to mode 2, the transport robot may be a transport robot configured to transport a transport object while sandwiching the transport object by cooperating with another transport robot. The transport robot may comprise: a main body; wheels; a drive part(s) mounted on the main body and configured to drive the wheels; a contact part that contacts the transport object; a rotation mechanism that makes the contact part rotatable relative to the main body; and a control part that controls the drive part(s). The control part may execute: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

In the present disclosure, as a control apparatus according to mode 3, the control apparatus may be a control apparatus that controls two transport robots adapted to sandwich a transport object in cooperation with each other to transport the transport object. The transport robot may comprise: a main body; wheels; a drive part(s) mounted on the main body and configured to drive the wheels; a contact part that contacts the transport object; and a rotation mechanism that makes the contact part rotatable relative to the main body. The control apparatus may execute: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

In the present disclosure, as a control method of a transport robot according to mode 4, the control method may be a control method of transport robots that controls two transport robots adapted to sandwich a transport object in cooperation with each other to transport the transport object. The transport robot may comprise: a main body; wheels; a drive part(s) mounted on the main body and configured to drive the wheels; a contact part that contacts the transport object; and a rotation mechanism that makes the contact part rotatable relative to the main body. The control method of the transport robot may comprise steps of: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation. Each of the steps may be executed using hardware resources.

In the present disclosure, as a program according to mode 5, the program may be a program executed by a transport robot that is configured to transport a transport object while sandwiching the transport object by cooperating with another transport robot. The transport robot may comprise: a main body; wheels; a drive part(s) mounted on the main body and configured to drive the wheels; a contact part that contacts the transport object; a rotation mechanism that makes the contact part rotatable relative to the main body; and a control part that controls the drive part(s). The program may cause the control part to execute processings of: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in the curve, based on the predicted orbit of the first transport robot, the second transport robot being arranged so that the contact part contacts a rear of the transport object in a traveling direction at the time of transportation.

In the present disclosure, a program according to mode 6, the program may be a program executed by a control apparatus that controls two transport robots that sandwich a transport object in cooperation with each other to transport the transport object. The transport robot may comprise: a main body; wheels; a drive part(s) mounted on the main body and configured to drive the wheels; a contact part that contacts the transport object; and a rotation mechanism that makes the contact part rotatable relative to the main body. The program may cause the control apparatus to execute processings of: predicting an orbit of a first transport robot of the two transport robots, the first transport robot being arranged so that the contact part contacts a front of the transport object in a traveling direction at the time of transportation; and predicting an orbit of a second transport robot of the two transport robots, so that the second transport robot pushes the transport object from outside of the orbit of the first transport robot in the curve, based on the predicted orbit of the first transport robot, the second transport robot being arranged so that the contact part contacts a rear of the transport object in a traveling direction at the time of transportation.

Hereinafter, exemplary embodiments will be described with reference to drawings. When drawing-reference signs are attached in this application, they are solely for the purpose of assisting understanding, and are not intended to be limited to the illustrated modes. Also, the following exemplary embodiments are merely examples, and do not limit the present invention. Further, connecting lines between blocks such as drawings referred to in the following description includes both bidirectional and unidirectional. A one-way arrow schematically shows a flow of a main signal (data), and does not exclude bidirectional. Furthermore, in circuit diagrams, block diagrams, internal configuration diagrams, connection diagrams, etc. shown in the disclosure of the present application, although explicit disclosure is omitted, an input port and an output port exist at the input end and the output end of each connection line, respectively. The same applies to the input/output interface. A program is executed via a computer apparatus, which comprises, for example, a processor, a storage device, an input device, a communication interface, and a display device as required, and the computer apparatus is configured to be able to communicate with inside device(s) or external apparatus(es) (including computer(s)) via a communication interface regardless of whether it is wired or wireless.

First Exemplary Embodiment

Figure 2:
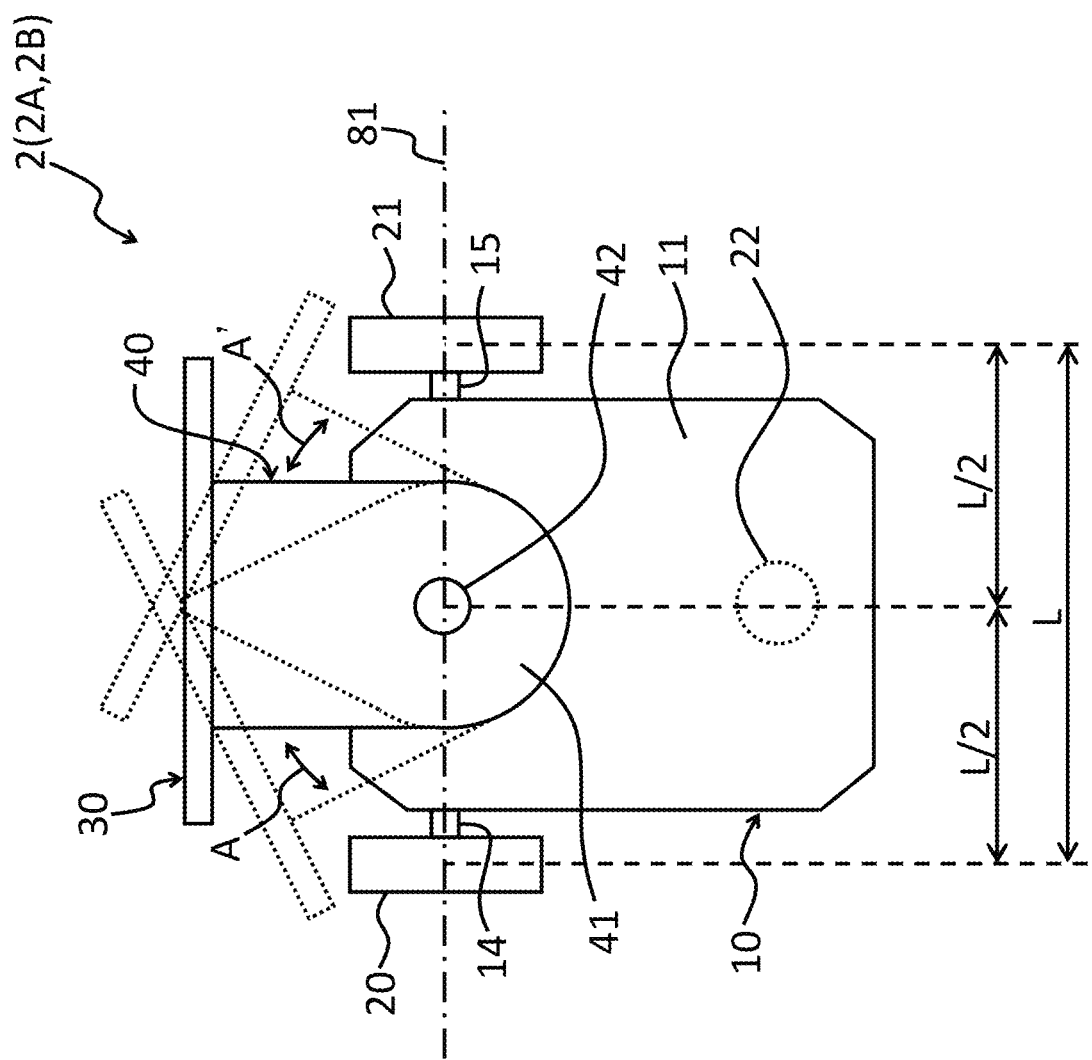
FIG. 2 is a plan view for explaining an operation of a rotation mechanism of the transport robot in the transport system according to the first exemplary embodiment.
Figure 3:
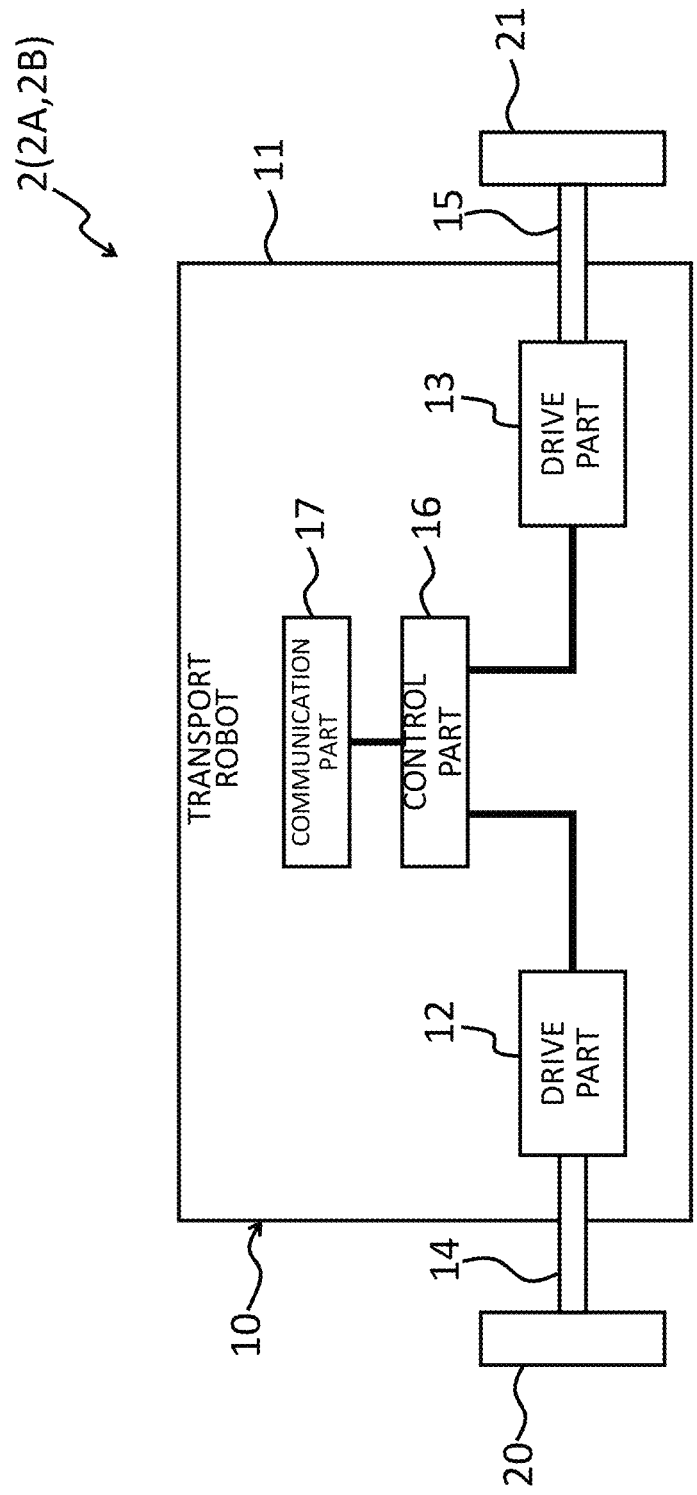
FIG. 3 is a block diagram schematically showing a circuit configuration of a main body of the transport robot in the transport system according to the first exemplary embodiment.
Figure 4:
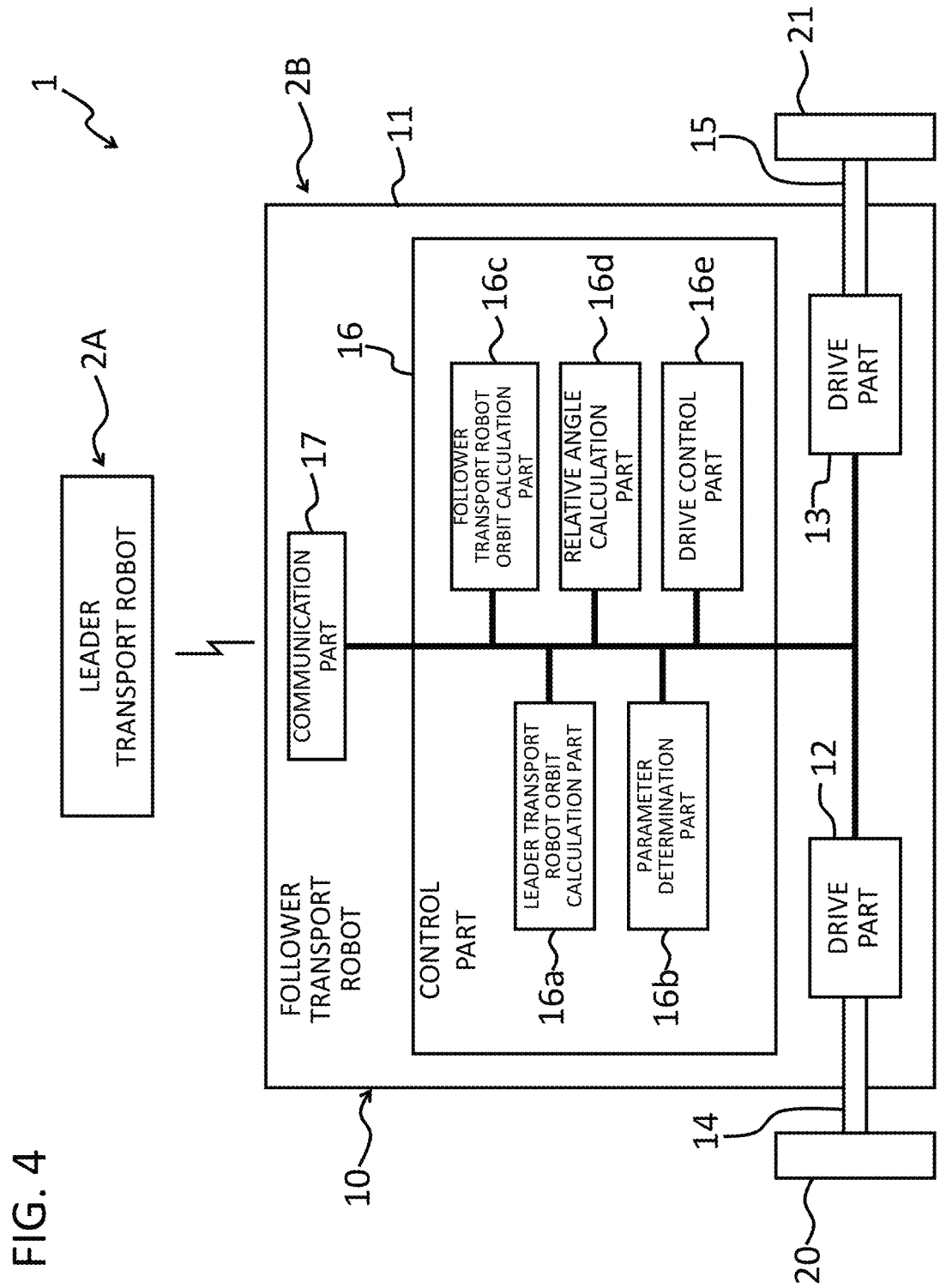
FIG. 4 is a block diagram schematically showing a configuration of the transport system according to the first exemplary embodiment.
Figure 5:
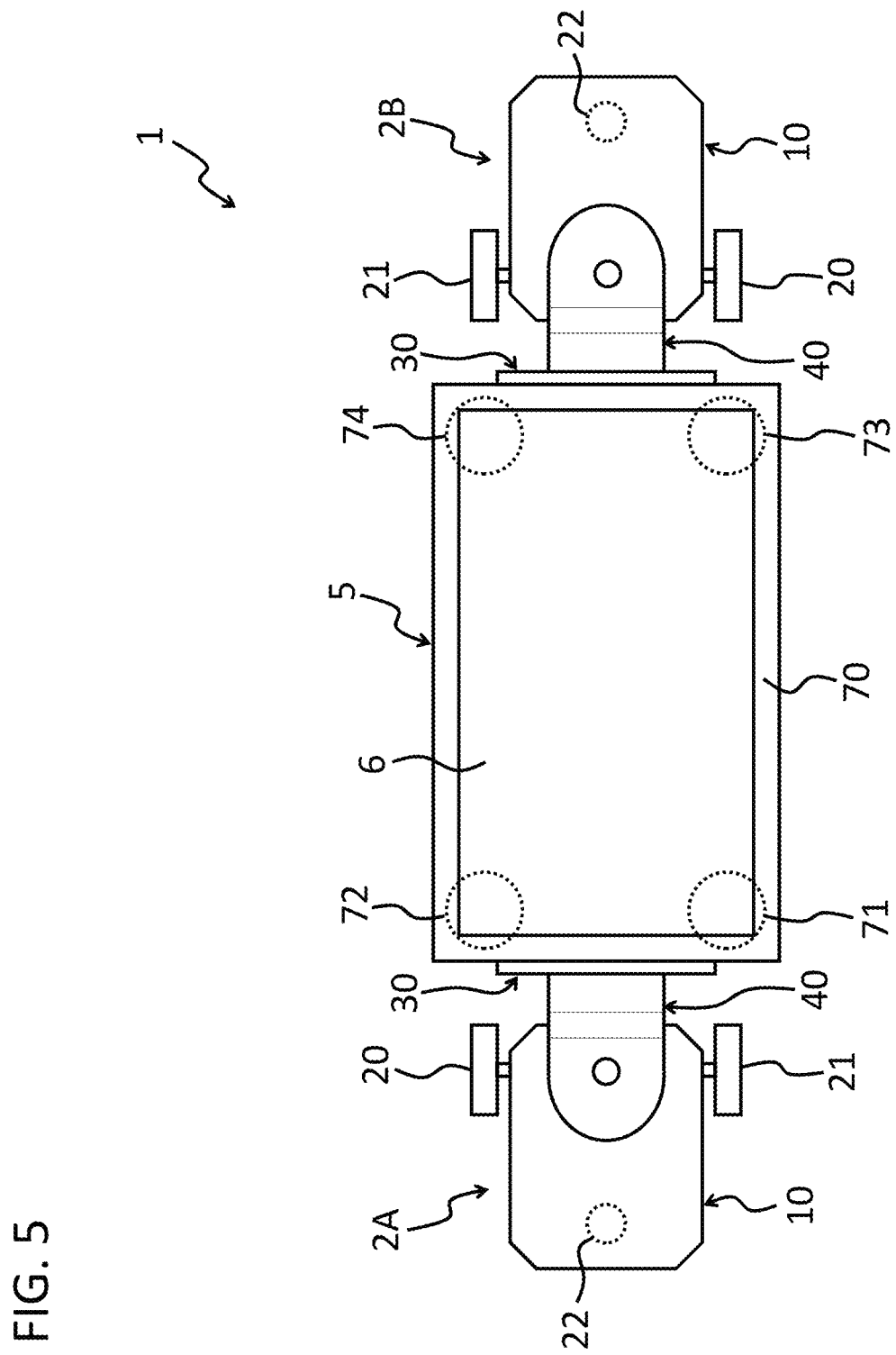
FIG. 5 is a plan view schematically showing an example of a state in which the transport system according to the first exemplary embodiment is transporting a transport object.
Figure 6:
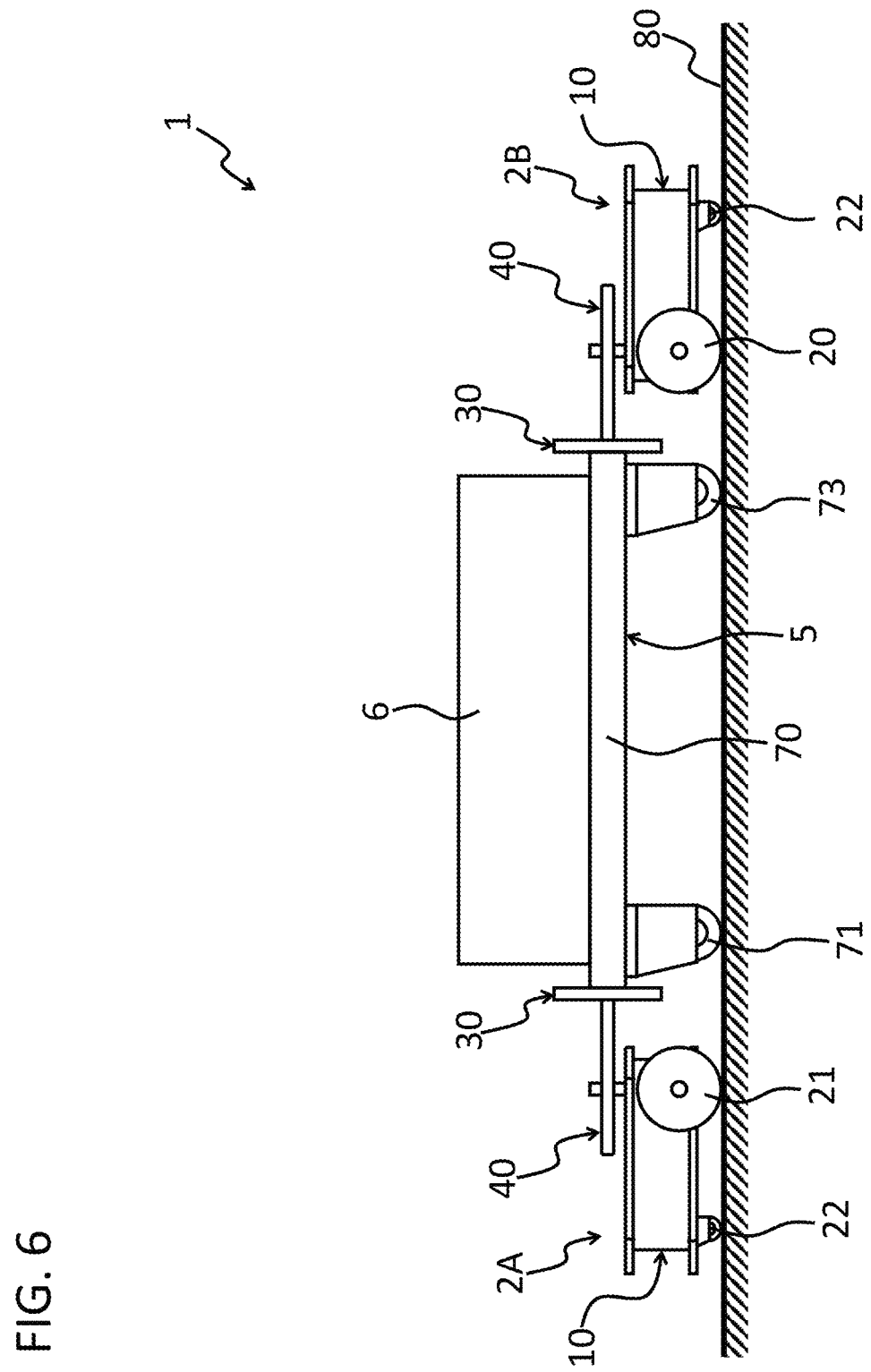
FIG. 6 is a side view schematically showing an example of the state in which the transport system according to the first exemplary embodiment is transporting the transport object.

A transport system according to a first exemplary embodiment will be described with reference to drawings. FIG. 1 is an external perspective view schematically showing a configuration of a transport robot in the transport system according to the first exemplary embodiment. FIG. 2 is a plan view for explaining an operation of a rotation mechanism of the transport robot in the transport system according to the first exemplary embodiment. FIG. 3 is a block diagram schematically showing a circuit configuration of a main body of the transport robot in the transport system according to the first exemplary embodiment. FIG. 4 is a block diagram schematically showing a configuration of the transport system according to the first exemplary embodiment. FIG. 5 is a plan view schematically showing an example of a state in which the transport system according to the first exemplary embodiment is transporting a transport object. FIG. 6 is a side view schematically showing an example of the state in which the transport system according to the first exemplary embodiment is transporting the transport object.

The transport system 1 is a system comprising a pair of transport robots 2A and 2B (see FIGS. 4 to 6).

The transport robot 2 (2A, 2B) is a robot that is configured to transport a transport object (corresponding to 5 in FIGS. 5 and 6) while sandwiching the transport object 5 by cooperating (collaborating) with each other when transporting the transport object 5 (see FIGS. 1 to 4).

The transport robot 2 (2A, 2B) is configured to cooperate with each other by connecting to each other so as to enable wireless communication (wired communication is also possible). As the transport robot 2 (2A, 2B), an uniaxial-two-wheel type robot in which left and right wheels 20 and 21 for driving are substantially on one axis (details will be described later with reference to FIG. 2) and an interval of the wheels 20 and 21 is a constant may be used. The transport robot 2 (2A, 2B) can move in a circular motion or go straight. The transport robot 2 (2A, 2B) may be configured so as not to stop and turn for smooth transportation. A leader transport robot 2A (first transport robot) and a follower transport robot 2B (second transport robot) may be the same configuration. The transport robot 2 (2A, 2B) comprises: a main body 10; a contact part 30; and a rotation mechanism 40.

The main body 10 is a unit comprising basic configuration parts (11 to 17, 20, 21 in FIG. 3, 22 in FIG. 2) for functioning as the transport robot 2 (see FIGS. 1 to 6). The main body 10 has a frame 11 and implements various configuration parts (12 to 17, 20, 21 in FIG. 3, 22 in FIG. 2) for functioning as a transport robot in the frame 11.

The frame 11 is a structure body for implementing various configuration parts (12 to 17, 20, 21 in FIG. 3, 22 in FIG. 2) for functioning as the transport robot 2 (see FIGS. 1 to 5). The frame 11 may be, for example, a housing structure, a box-shaped structure, or the like. A pair of wheels 20 and 21 is rotatably attached to both sides of the frame 11. A caster 22 is attached to a bottom surface of the frame 11.

The drive parts 12 and 13 are function parts that drive the corresponding wheels 20 and 21 (see FIGS. 3 and 4). As the drive parts 12 and 13, for example, a drive unit comprising: a motor; a decelerator; a driver; various sensors (current sensor, torque sensor, position sensor, etc.), a regulator, and the like may be used. The drive parts 12 and 13 are attached to the frame 11. A rotation power of the drive part 12 can be transmitted to the wheels 20 via a shaft 14. A rotation power of the drive part 13 can be transmitted to the wheels 21 via a shaft 15.

The shafts 14 and 15 are shaft members that transmit rotation power of the corresponding drive parts 12 and 13 to the corresponding wheels 20 and 21 (see FIGS. 3 and 4). The shaft 14 is connected to an output shaft (not shown) of the drive part 12 and extends to one side surface outside the frame 11. The shaft 14 is attached to the shaft of the wheel 20 outside the frame 11. The shaft 15 is connected to an output shaft (not shown) of the drive part 13 and extends to another side surface (opposite side relative to the one side surface) outside the frame 11. The shaft 15 is attached to the shaft of the wheel 21 outside the frame 11. The shafts 14 and 15 are arranged so as to be coaxial with each other on an imaginary line (axis 81) shown by a dotted chain line in FIG. 2. The shafts 14 and 15 may be arranged so that the wheels 20 and 21 are tilted (so as to have a camber angle) and may be designed so that tilts of the wheels 20 and 21 change (so that the camber angle fluctuates) by using a suspension, a constant velocity joint or the like.

The control part 16 is a function part that controls a pair of drive parts 12 and 13 by cooperating with other transport robot (see FIGS. 3 and 4). As the control part 16, for example, a control unit comprising: a memory; a processor; and the like may be used. In this case, the control part may be configured to execute control processing by executing a program in the processor while using the memory. The control part 16 can adjust a movement velocity and a moving direction of the transport robot 2 by controlling the drive parts 12 and 13. The control part 16 is attached to the frame 11. The control part 16 can be communicably connected to another transport robot via the communication part 17.

When the control part 16 operates as the leader transport robot 2A, or when the transport robot 2 moves independently, the control part 16 starts controls of the drive parts 12 and 13 in a case where instructions of destinations (including an intermediate destination and a final destination) and movements are acquired from external (not shown; for example, a network to which an information communication terminal and an information processing apparatus capable of near field communication are connected) through the communication part 17. The control part 16 controls the drive parts 12 and 13 in a control loop for a predetermined time period (for example, several tens of ms (milliseconds)). In the control loop, first, the control part 16 acquires an own current location (hereinafter, may be abbreviated as "own current location") of the transport robot 2. Here, the own current location may be acquired from outside through the communication part 17; may be calculated and acquired by oneself based on a control history of the drive parts 12 and 13; and may be acquired from a position detection part (not shown; for example, a GPS (Global Positioning System) receiver, a beacon receiver, etc.) comprised in the leader transport robot 2A. In the control loop, the control part 16 determines whether or not the acquired own current location has reached an input destination (the nearest destination in front). When the own current location of the control part 16 has not reached the destination, in the control loop, the control part 16 calculates control amounts (for example, rotation velocities of the wheels 20 and 21) of the drive parts 12 and 13; controls the drive parts 12 and 13 based on the calculated control amounts; and then acquires an own current location again to continue the control loop. When the own current location has reached the destination, the control part 16 determines whether or not the own current location has reached the final destination. When the own current location has not reached the final destination, the control part 16 updates the destination to the nearest destination in front. When the own current location has reached the final destination, the control part 16 stops control of the drive parts 12 and 13. When operating as the leader transport robot 2A, the control part 16 transmits information of an own current location (for example, position coordinate), a direction (for example, traveling direction), and control amounts (for example, rotation velocities) of the left and right wheels 20 and 21 to the follower transport robot 2B through the communication part 17.

When operating as the follower transport robot 2B, the control part 16 realizes: a leader transport robot orbit calculation part 16a; a parameter determination part 16b; a follower transport robot orbit calculation part 16c; a relative angle calculation part 16d; and a drive control part 16e by executing a program for the follower transport robot 2B (see FIG. 4).

The leader transport robot orbit calculation part 16a is a processing part that calculates (predicts) an orbit of the leader transport robot 2A (see FIG. 4). The leader transport robot orbit calculation part 16a acquires (receives) the latest information (latest operation information of the leader transport robot 2A) of a current location (for example, position coordinate); a direction (traveling direction); and control amounts (rotation velocities) of the left and right wheels 20 and 21 of the leader transport robot 2A from the leader transport robot 2A, and calculates (predicts) an orbit of the leader transport robot 2A based on the acquired information. The information from the leader transport robot 2A may be acquired by the leader transport robot orbit calculation part 16a requesting to the leader transport robot 2A; or may be periodically or automatically acquired from the leader transport robot 2A without requesting information.

The parameter determination part 16b is a processing part that determines parameters for calculating an orbit of the follower transport robot 2B (see FIG. 4). Here, as parameters, a value $\phi_{min}$ when maximum values of a relative angle in traveling directions between the leader transport robot 2A and the follower transport robot 2B after an arbitrary time period has elapsed from a time point of a current location; a time period $\Delta t$ after update in the arbitrary time period become minimum; a time period $\Delta t'$ before update in the arbitrary time period can be used. An initial value of $\phi_{min}$ is ∞ (infinity), and when a latest $\phi$ calculated by the relative angle calculation part 16d is $\phi_{min}$ or less, $\phi_{min}$ is updated to the latest $\phi$. An initial value of $\Delta t$ is $\phi$ (zero), and when the latest $\phi$ calculated by the relative angle calculation part 16d is $\phi_{min}$ or less, $\Delta t$ is updated to a value obtained by adding a predetermined value (for example, 1 second) to the latest $\Delta t$. An initial value of $\Delta t'$ is 0 (zero), and when the latest $\phi$ calculated by the relative angle calculation part 16d is $\phi_{min}$ or less, $\Delta t'$ is updated to the latest $\Delta t$. The parameter determination part 16b updates the parameters ($\phi_{min}$, $\Delta t$, $\Delta t'$). The parameter determination part 16b determines whether or not the latest determined (or updated) $\Delta t$ is a preset $t_{max}$ or less. The parameter determination part 16b determines whether or not the latest maximum value $\phi$ of a relative angle in traveling directions between the leader transport robot 2A and the follower transport robot 2B calculated by the relative angle calculation part 16d is the latest determined (or updated) is $\phi_{min}$ or less.

The follower transport robot orbit calculation part 16c is a processing part that calculates (predicts) an orbit of the follower transport robot 2B (see FIG. 4). The follower transport robot orbit calculation part 16c calculates (predicts) an orbit of the follower transport robot 2B when the follower transport robot 2B moves toward a position directly behind the leader transport robot 2A after the latest $\Delta t$ based on: an orbit of the leader transport robot 2A calculated by the leader transport robot orbit calculation part 16a; and the latest $\Delta t$ determined (or updated) by the parameter determination part 16b. When the latest $\Delta t$ is larger than $t_{max}$, the follower transport robot orbit calculation part 16c calculates (predicts) an orbit of the follower transport robot 2B when the follower transport robot 2B moves toward a position directly behind the leader transport robot 2A after a latest $\Delta t'$ based on: an orbit of the leader transport robot 2A calculated by the leader transport robot orbit calculation part 16a; and the latest $\Delta t'$ determined (or updated) by the parameter determination part 16b.

The relative angle calculation part 16d is a processing part that calculates a relative angle in traveling directions between the leader transport robot 2A and the follower transport robot 2B (see FIG. 4). The relative angle calculation part 16d calculates (predicts) a maximum value $\phi$ of a relative angle in traveling directions between the leader transport robot 2A and the follower transport robot 2B based on: an orbit of the leader transport robot 2A calculated by the leader transport robot orbit calculation part 16a; and the latest orbit of the follower transport robot 2B calculated by the follower transport robot orbit calculation part 16c.

The drive control part 16e is a processing part that controls the drive parts 12 and 13 (see FIG. 4). The drive control part 16e controls the drive parts 12 and 13 based on an orbit of the follower transport robot 2B (an orbit of the follower transport robot 2B when the follower transport robot 2B moves toward a position directly behind the leader transport robot 2A after $\Delta t'$) calculated by the follower transport robot orbit calculation part 16c.

The communication part 17 is a function part that enables communication with another transport robot (see FIGS. 3 and 4). The communication part 17 may be configured to be able to communicate with other apparatus.

The wheels 20 and 21 are drive wheels that realize a movement of the transport robot 2 (see FIGS. 1 to 6). The wheel 20 is fixed to the shaft 14 at an axial center of the wheel 20. The wheel 21 is fixed to the shaft 15 at an axial center of the wheel 21. The wheels 20 and 21 are arranged so as to become coaxial with each other on the axis 81 (see FIG. 2). The wheels 20 and 21 may be arranged so as to be tilted (so as to have a camber angle), or may be designed so that a tilt changes (so that a camber angle fluctuates) by using a suspension, a constant velocity joint, or the like.

The caster 22 is a non-drive wheel that functions as an auxiliary wheel for the wheels 20 and 21 (see FIGS. 2, 5, and 6). The caster 22 is configured to be rotatable so that a traveling direction can be changed.

The contact part 30 is a portion that contacts the transport object 5 (see FIGS. 1, 2, 5, and 6). The contact part 30 is fixed to one end of an arm 41 of the rotation mechanism 40. The arm 41 is rotatably supported by the main body 10 at a shaft part 42 provided near the other end of the arm 41. As a result, the contact part 30 can rotate together with the arm 41 of the rotation mechanism 40 around the shaft part 42 extending in a direction perpendicular to a paper surface of FIG. 2, as shown by arrows A and A' of FIG. 2. A rotation direction of the contact part 30 includes at least longitudinal direction (for example, left-and-right direction, horizontal direction) relative to the main body 10 and may include a latitude direction (for example, up-and-down direction and vertical direction). The contact part 30 comprises a plate member 31. The plate member 31 has a friction part 32 on a surface that contacts the transport object 5. The plate member 31 is fixed to the arm 41 of the rotation mechanism 40. The friction part 32 increases a frictional force generated between the friction part 32 and the transport object 5 when the friction part 32 contacts the transport object 5 (see FIG. 1). As a result, the friction part 32 prevents or suppresses a relative slippage of the transport robot 5 in a state of contacting the friction part 32. As the friction part 32, a material having a high coefficient of friction and an elastic material having a restoring force (for example, rubber) can be used. The contact part 30 becomes a portion that pushes the transport object 5 when the transport robot 2 is arranged on a follower side in a traveling direction of the transport object 5 during transportation and becomes a portion that receives the transport object 5 when the transport robot 2 is arranged on a leader side during transportation. The contact part 30 is smaller than a width of the transport object 5 in FIG. 5, but the contact part 30 may be larger than the width of the transport object 5.

The rotation mechanism 40 is a mechanism that makes the contact part 30 rotatable relative to the main body 10 (see FIGS. 1, 2, 5, and 6). The rotation mechanism 40 comprises a shaft part 42 attached to an upper surface of the frame 11 of the main body 10. In an aspect of improving an efficiency of drive control, a central axis of the shaft part 42 is preferably designed so as to pass through a midpoint of a length "L" between the wheels 20 and 21 on the axis 81 (see FIG. 2), but not limited to this design. The rotation mechanism 40 comprises the arm 41 rotatably attached to the shaft part 42 in a longitude direction (for example, the horizontal direction and left-and-right direction). A plate member 31 of the contact part 30 is attached to the arm 41. The arm 41 is designed so that the contact part 30 does not conflict with the main body 10 and the wheels 20 and 21 when the contact part 30 is rotated. Although the number of arm 41 is one in FIG. 1, there may be a plurality of arms 41 at intervals. A rotatable angle of the rotation mechanism 40 is not particularly limited, but can be 45° to the left or right. The rotation mechanism 40 may comprise a restoring mechanism that restores the contact part rotated from a predetermined position (for example, a front position of the main body 10) so as to return to the predetermined position. Also, the rotation mechanism 40 may comprise a damping mechanism for damping a vibration of the restoration mechanism.

As the transport object 5, a push cart, a dolly, or the like, comprising a plurality of pivotable casters 71 to 74 (wheels) that can be used for a pedestal 70 on which a freight 6 is placed (see FIGS. 5 and 6). The transport object 5 may be one (for example, cardboard) that does not have wheels such as casters.

Figure 7:
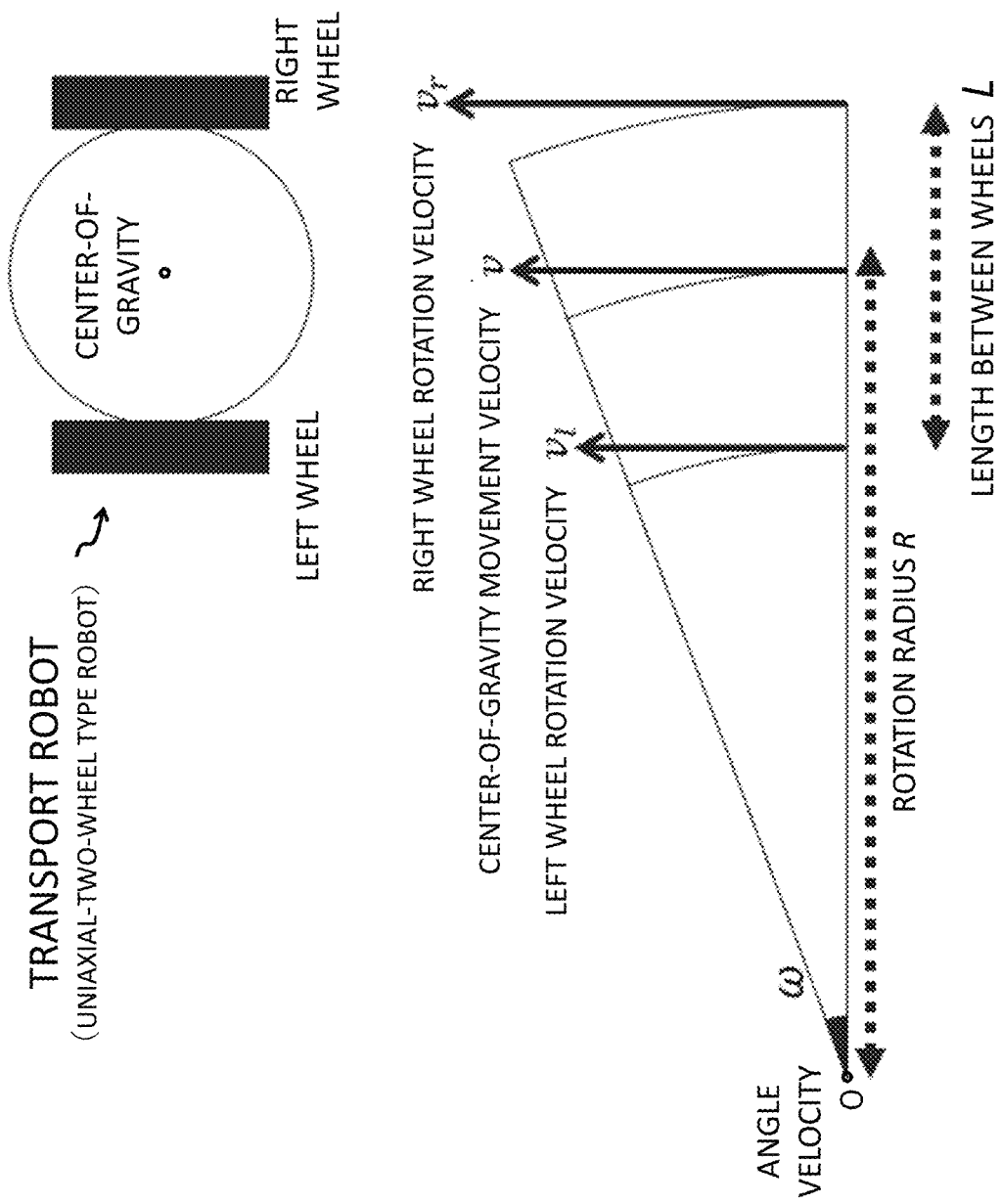
FIG. 7 is a first image diagram for explaining how to move when the transport robot in the transport system according to the first exemplary embodiment is a uniaxial-two-wheel type robot.
Figure 8:
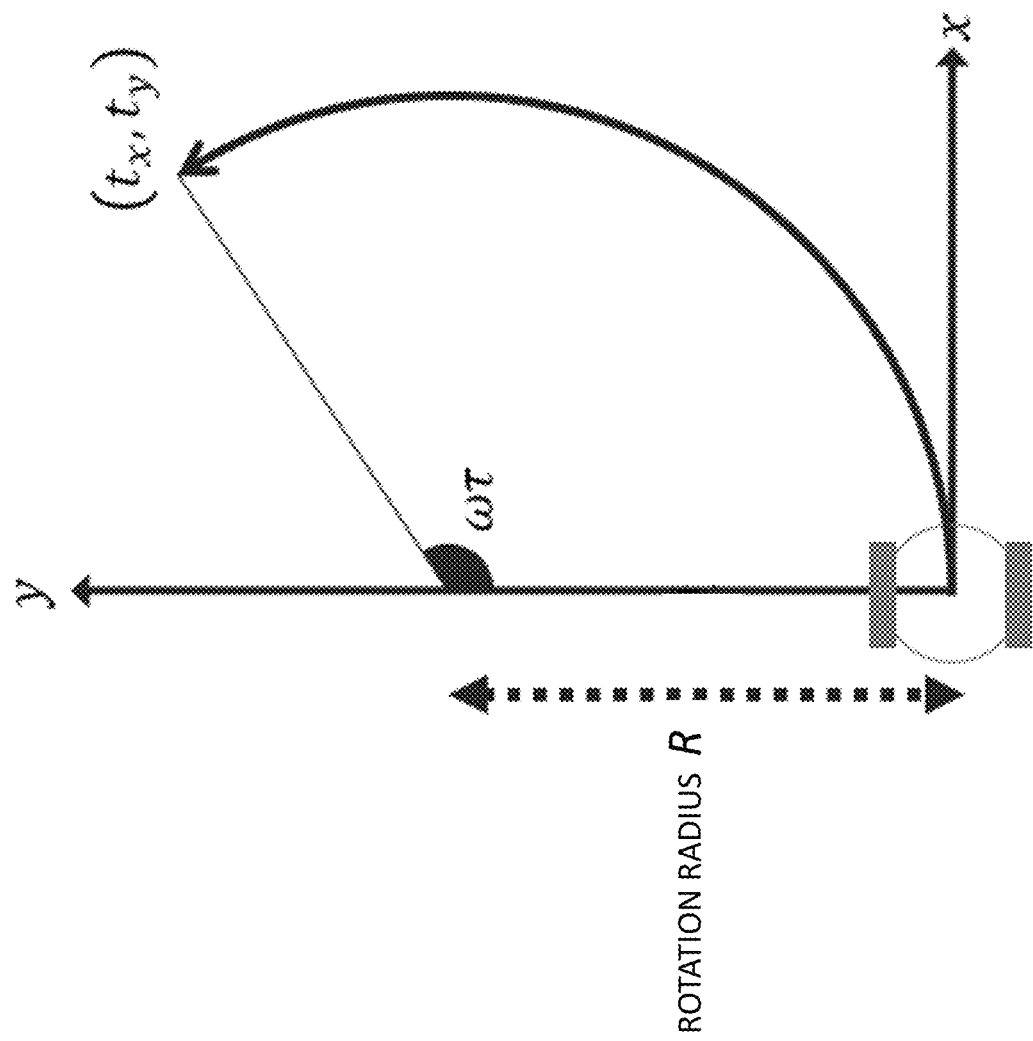
FIG. 8 is a second image diagram for explaining how to move when the transport robot in the transport system according to the first exemplary embodiment is a uniaxial-two-wheel type robot.

Next, how to move when the transport robot in the transport system according to the first exemplary embodiment is a uniaxial-two-wheel type robot will be described with reference to drawings. FIG. 7 is a first image diagram for explaining how to move when the transport robot in the transport system according to the first exemplary embodiment is a uniaxial-two-wheel type robot. FIG. 8 is a second image diagram for explaining how to move when the transport robot in the transport system according to the first exemplary embodiment is a uniaxial-two-wheel type robot.

Referring to FIG. 7, when the transport robot being a uniaxial-two-wheel type robot moves at a position of a rotation radius "R" centered on a point "o" at an angular velocity ω, and when a length between left and right wheels is defined as "L", a movement velocity "v" of a center-of-gravity, a rotation velocity "$v_r$" of the right wheel and a rotation velocity "$v_l$" of the left wheel can be expressed as Formula 1. Also, the rotation velocity "$v_r$" of the right wheel and the rotation velocity "$v_l$" of the left wheel can be expressed as Formula 2 when using the movement velocity "v" of the center-of-gravity. If a turning radius "R", a length between wheels "L", and a movement velocity "v" of the center-of-gravity are known from Formula 2, the rotation velocity "$v_r$" of the right wheel and the rotation velocity "$v_l$" of the left wheel are uniquely determined.

$$v = R\omega \quad \text{[Formula 1]}$$
$$v_r = \left(R + \frac{L}{2}\right)\omega$$
$$v_l = \left(R - \frac{L}{2}\right)\omega$$
$$v_r = v \cdot \left(1 + \frac{L}{2R}\right) \quad \text{[Formula 2]}$$
$$v_l = v \cdot \left(1 - \frac{L}{2R}\right)$$

The "·" in Formula 2 represents multiplication. The same applies hereinafter.

Referring to FIG. 8, when an initial position of the transport robot being a uniaxial-two-wheel type robot is defined as (0,0); a traveling direction is defined as x-axis; a turning radius is defined as "R"; and the robot advances at a constant angular velocity ω for τ seconds, a coordinate ($t_x$, $t_y$) at which the transport robot exists can be expressed as Formula 3.

$$(t_x, t_y) = (R \sin \omega\tau, R \cdot (1 - \cos \omega\tau)) \quad \text{[Formula 3]}$$

Therefore, when moving the transport robot from the initial position (0,0) to the coordinate ($t_x$, $t_y$) drawing an arc, a rotation center coordinate, a left wheel rotation velocity "$v_l$", and a right wheel rotation velocity "$v_r$" can be expressed as Formula 4. When rotating wheels according to Formula 4, the transport robot can be moved by drawing an arc toward a target coordinate.

$$\text{Rotation center coordinate} = \left(0, \frac{t_x^2 + t_y^2}{2t_y}\right) \quad \text{[Formula 4]}$$

-continued $$\text{Turning radius } R = \frac{t_x^2 + t_y^2}{2|t_y|}$$

$$\text{Left wheel rotation velocity} = v \cdot \left(1 + \frac{L \cdot t_y}{t_x^2 + t_y^2}\right)$$

$$\text{Right wheel rotation velocity} = v \cdot \left(1 - \frac{L \cdot t_y}{t_x^2 + t_y^2}\right)$$

Figure 9:
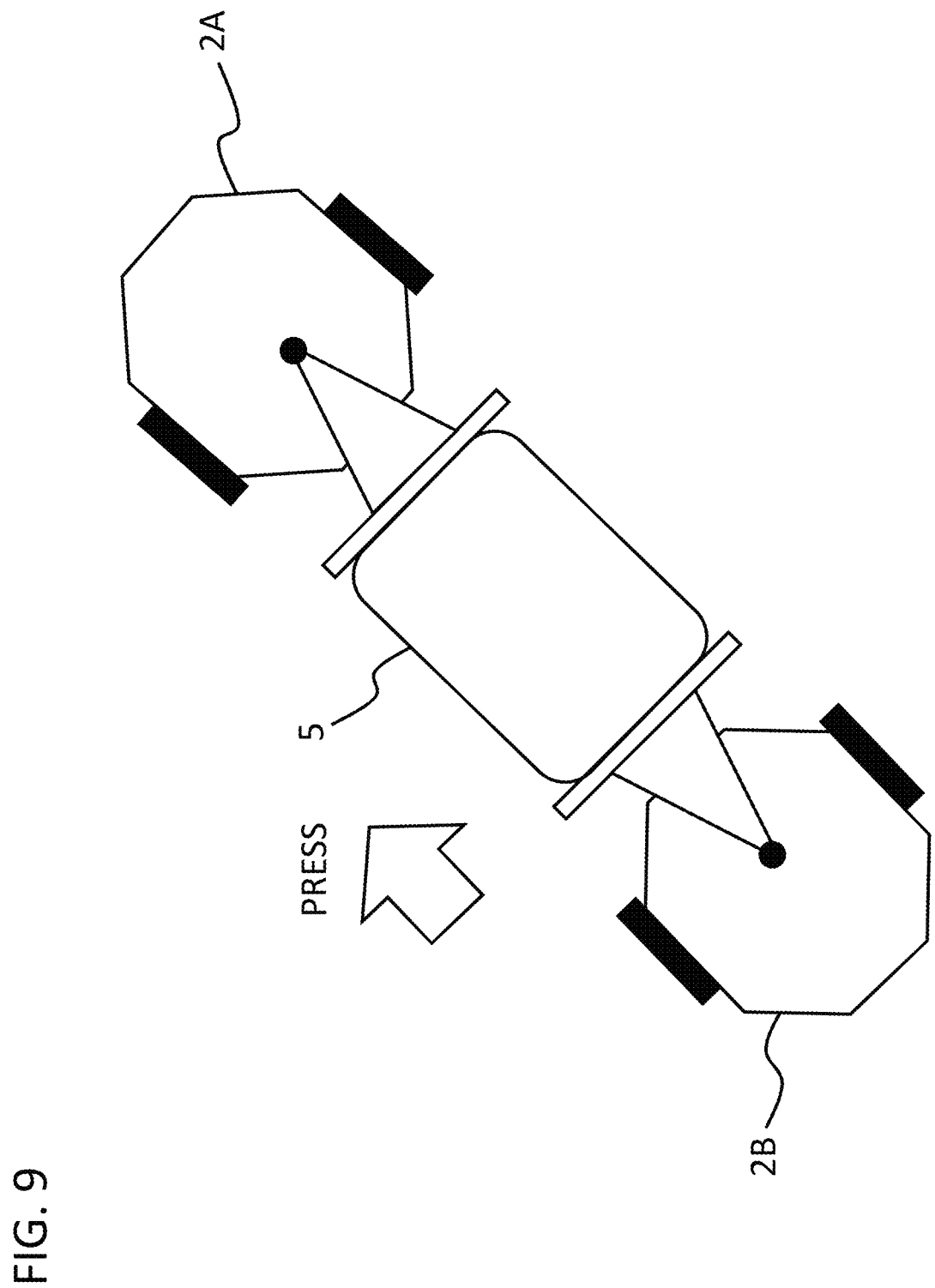
FIG. 9 is an image diagram schematically showing a pressing of a follower transport robot in the transport system according to the first exemplary embodiment.
Figure 10:
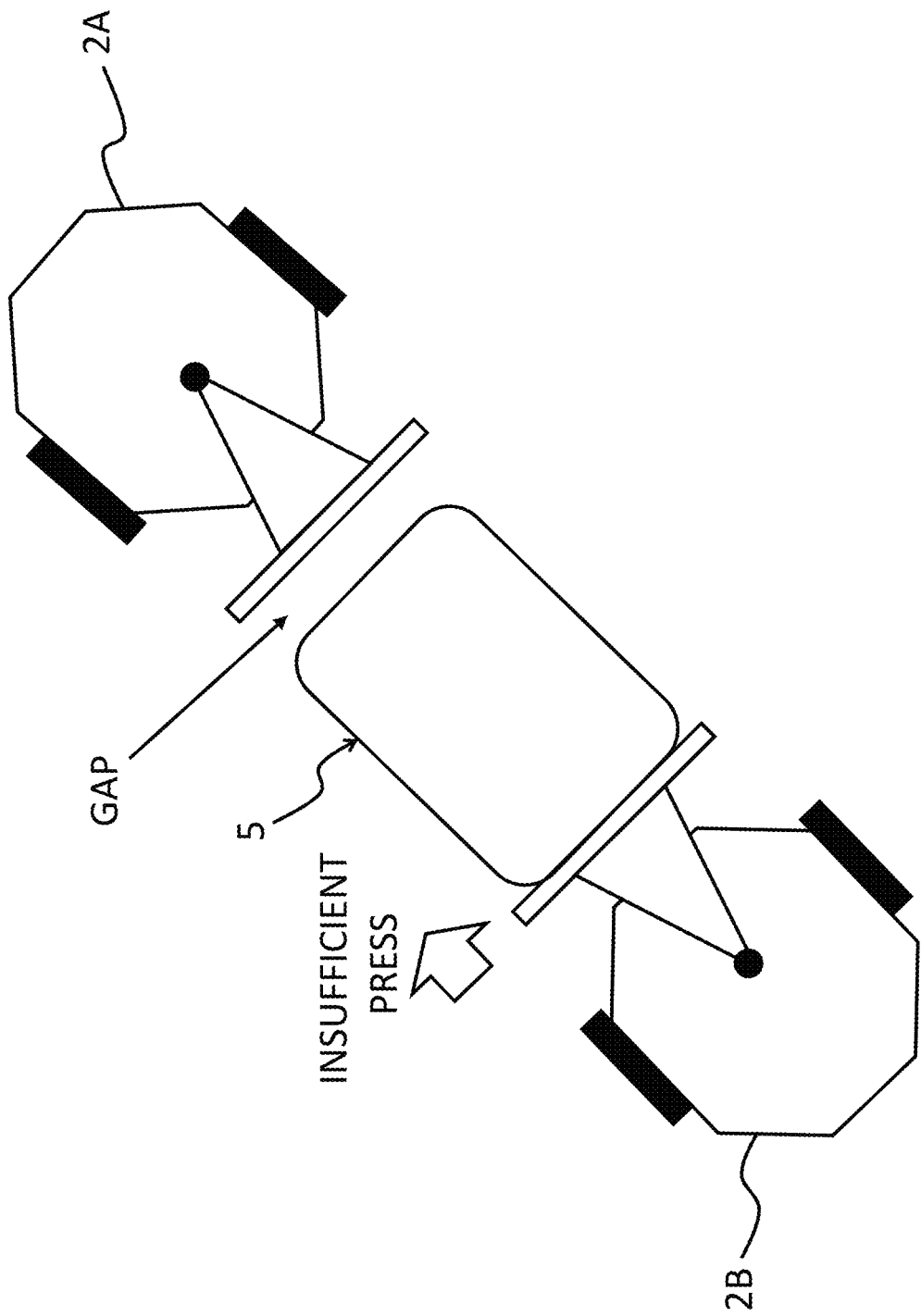
FIG. 10 is an image diagram schematically showing a state of insufficient pressing of the follower transport robot in the transport system according to the comparative example.
Figure 11:
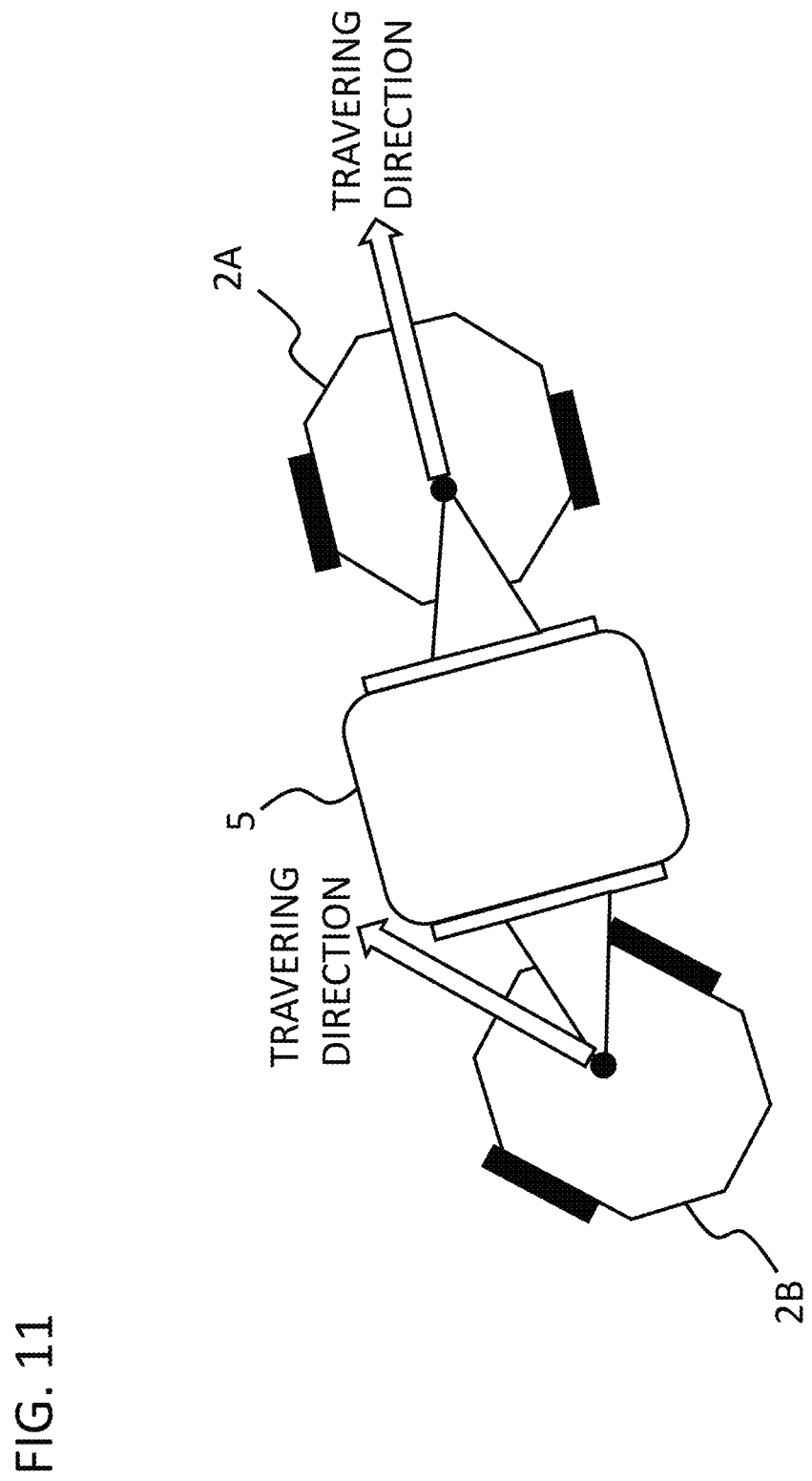
FIG. 11 is an image diagram schematically showing a state in which the follower transport robot moves so as to reduce a relative angle in traveling directions between the transport robots in the transport system according to the first exemplary embodiment.
Figure 12:
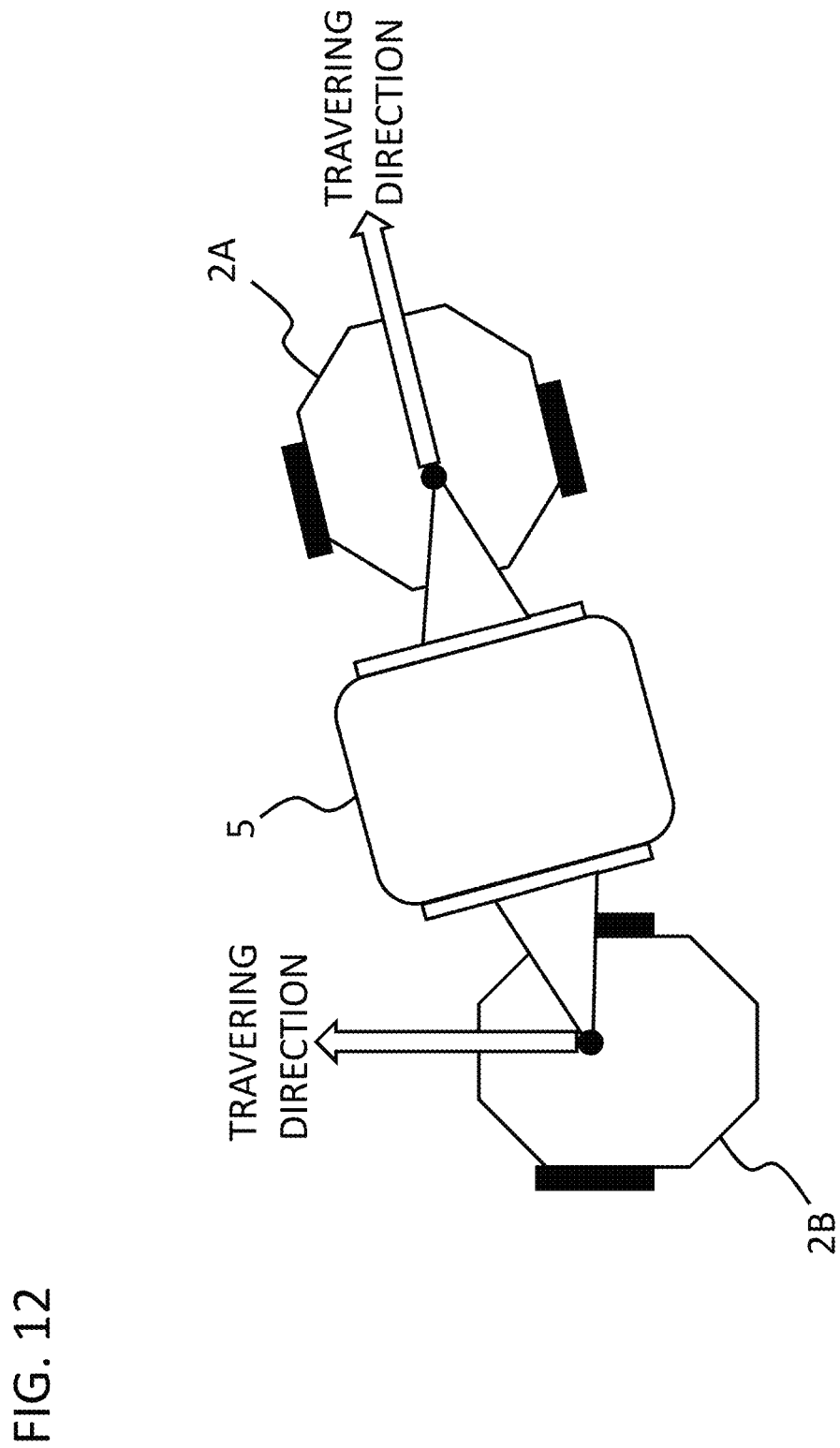
FIG. 12 is an image diagram schematically showing a state in which a relative angle of traveling directions between the transport robots in the transport system according to the comparative example is large.
Figure 13:
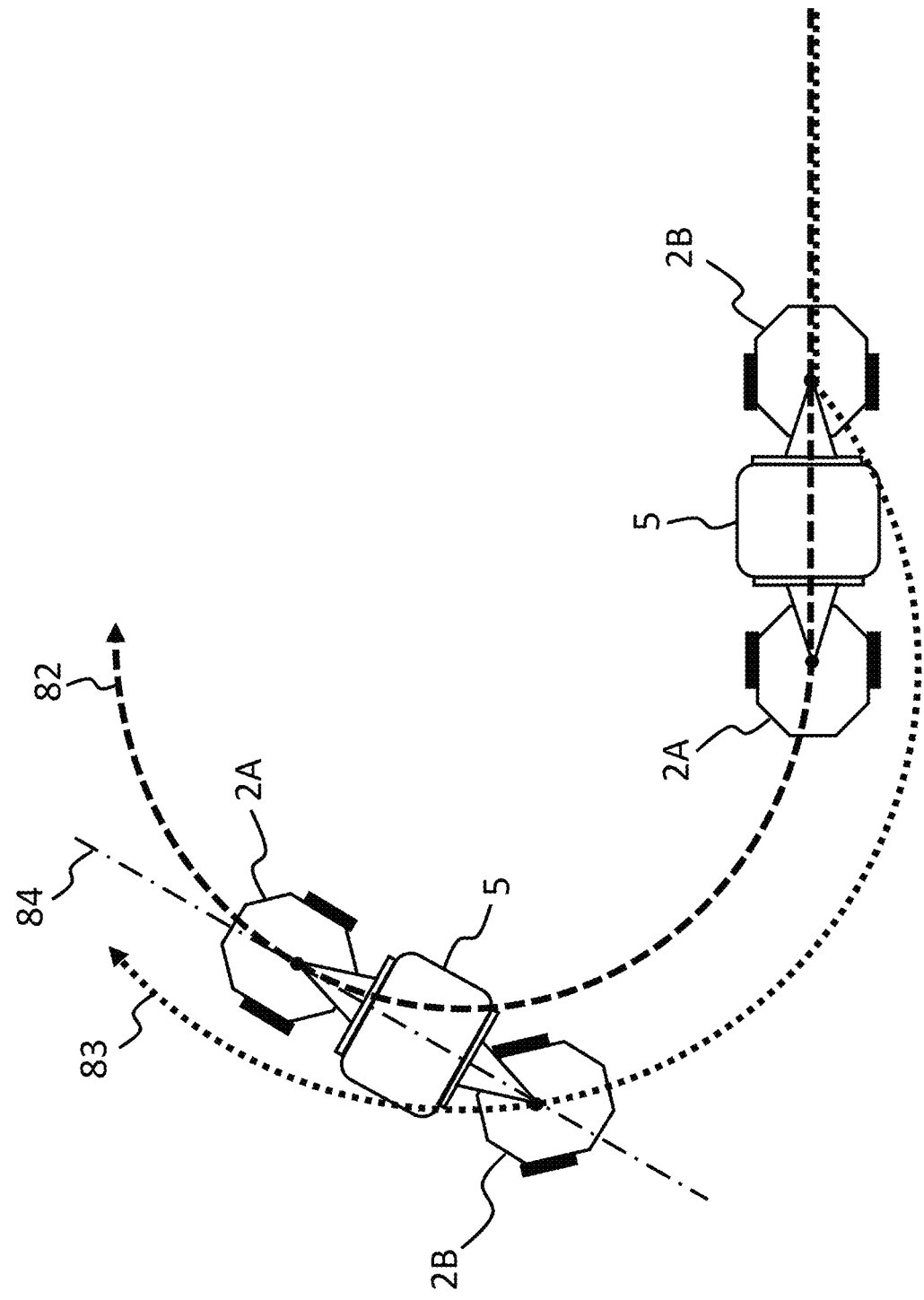
FIG. 13 is an image diagram schematically showing a state in which the follower transport robot in the transport system according to the first exemplary embodiment presses from outside of an orbit of the leader transport robot in a curve.
Figure 14:
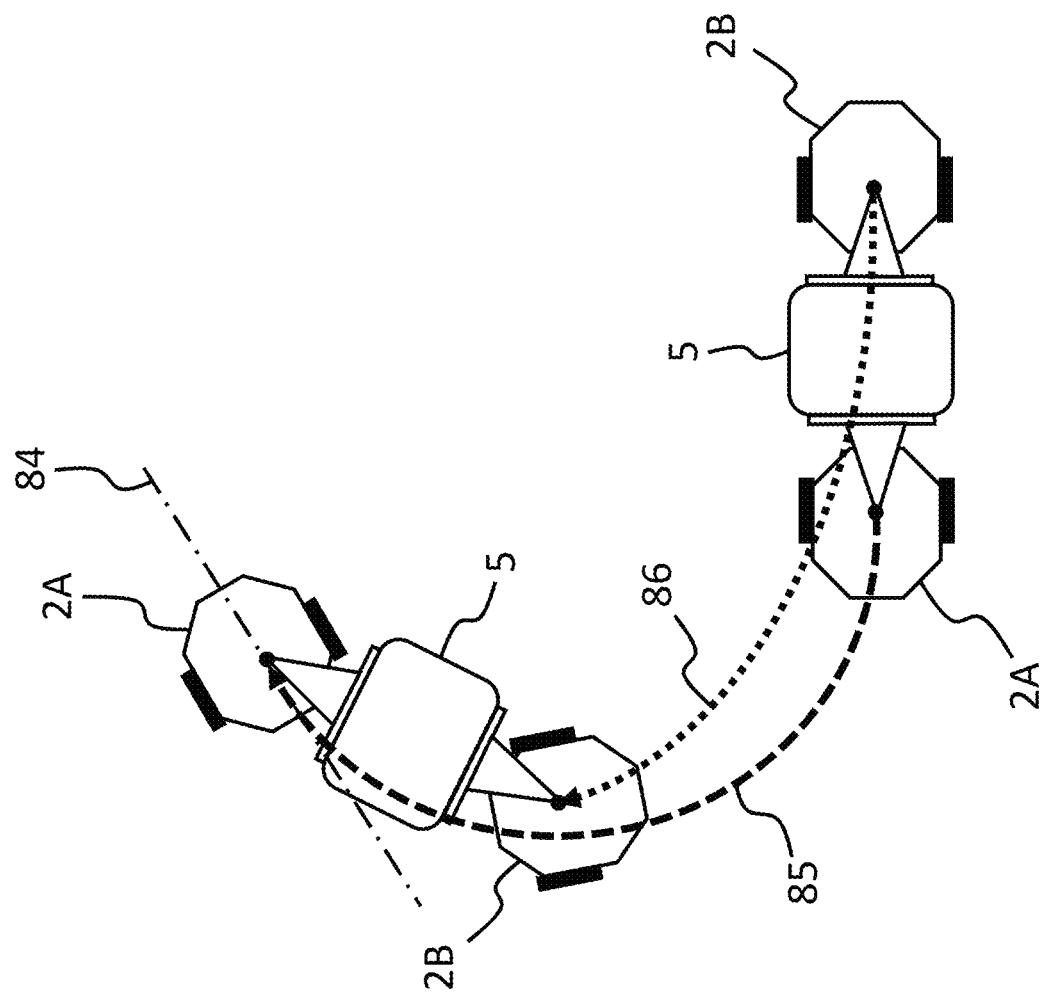
FIG. 14 is an image diagram schematically showing a state in which the follower transport robot in the transport system according to the comparative example presses from inside of the orbit of the leader transport robot in a curve.
Figure 15:
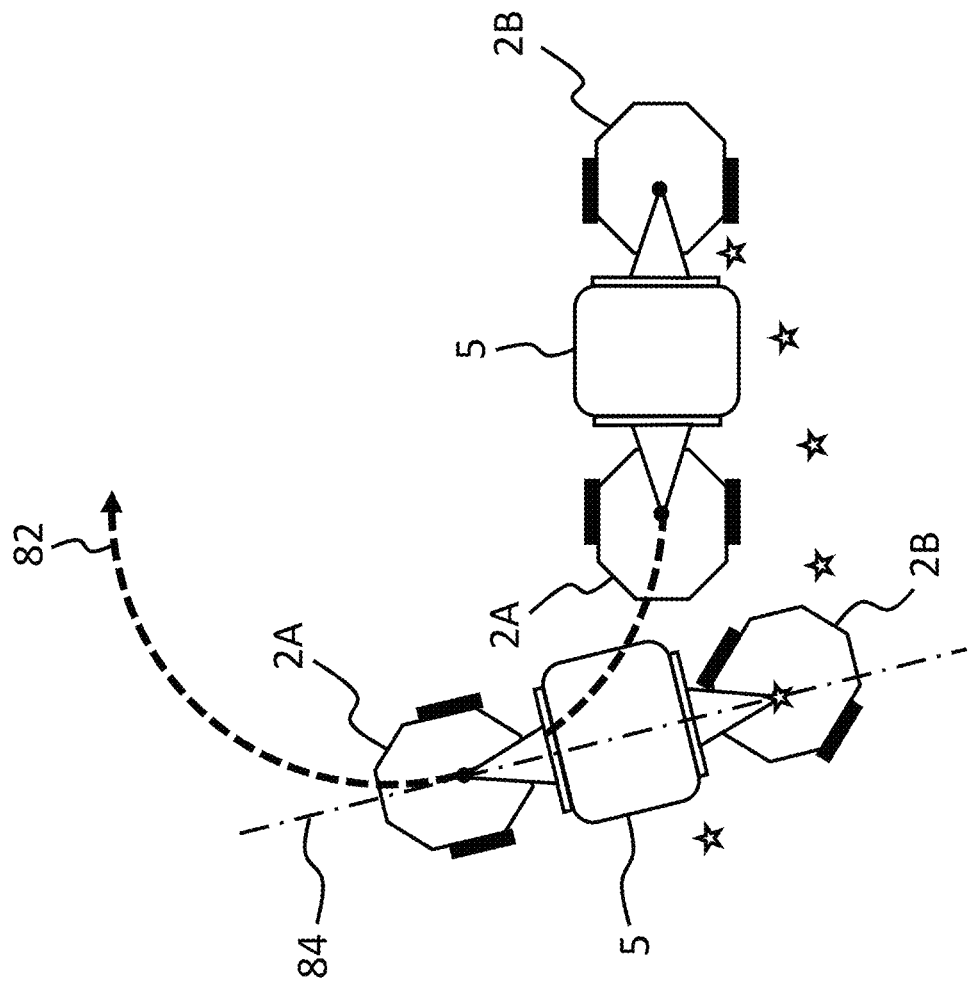
FIG. 15 is an image diagram schematically showing a case where the follower transport robot in the transport system according to the first exemplary embodiment moves toward a position directly behind the leader transport robot after sequential Δt (>0) for each control cycle in a curve.
Figure 16:
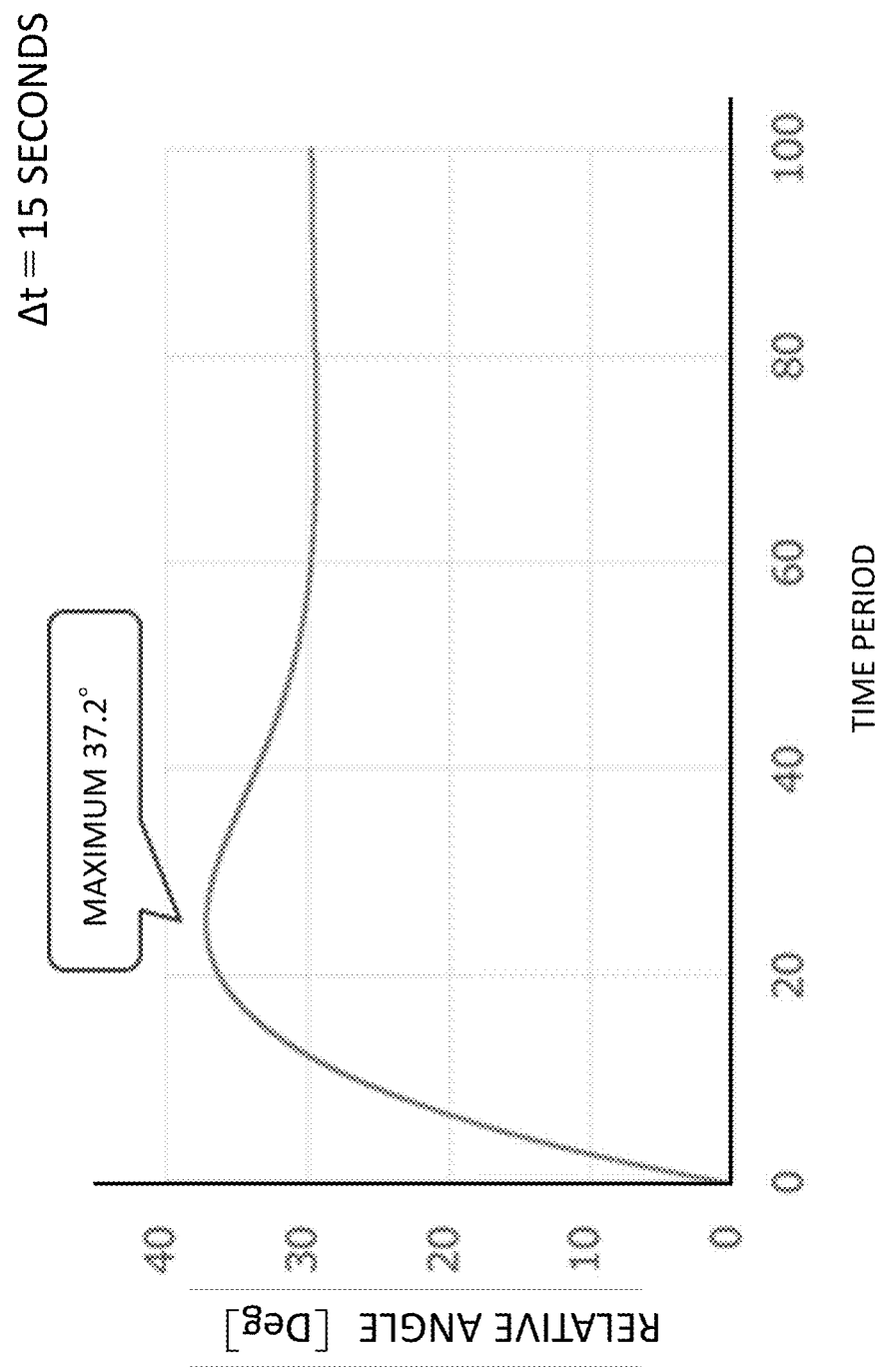
FIG. 16 is a graph showing a time-dependent change of a relative angle in traveling directions between the follower transport robot and the leader transport robot when the follower transport robot in the transport system according to the first exemplary embodiment moves toward a position directly behind the leader transport robot after sequential Δt=15 seconds for each control cycle in a curve.
Figure 17:
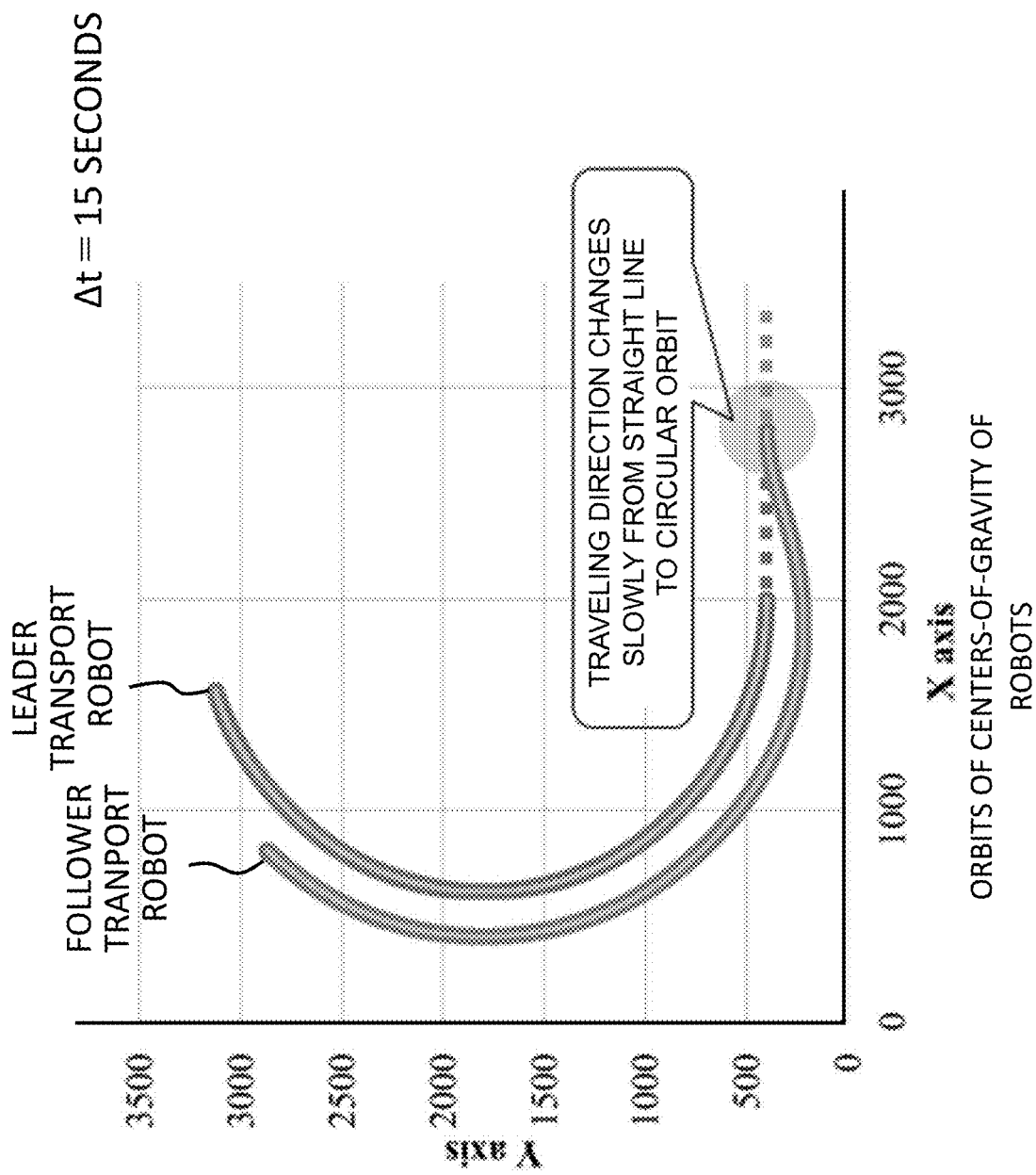
FIG. 17 is a graph showing orbits of centers of gravity of the follower transport robot and the leader transport robot when the follower transport robot in the transport system according to the first exemplary embodiment moves toward a position directly behind the leader transport robot after sequential Δt=15 seconds for each control cycle in a curve.
Figure 18:
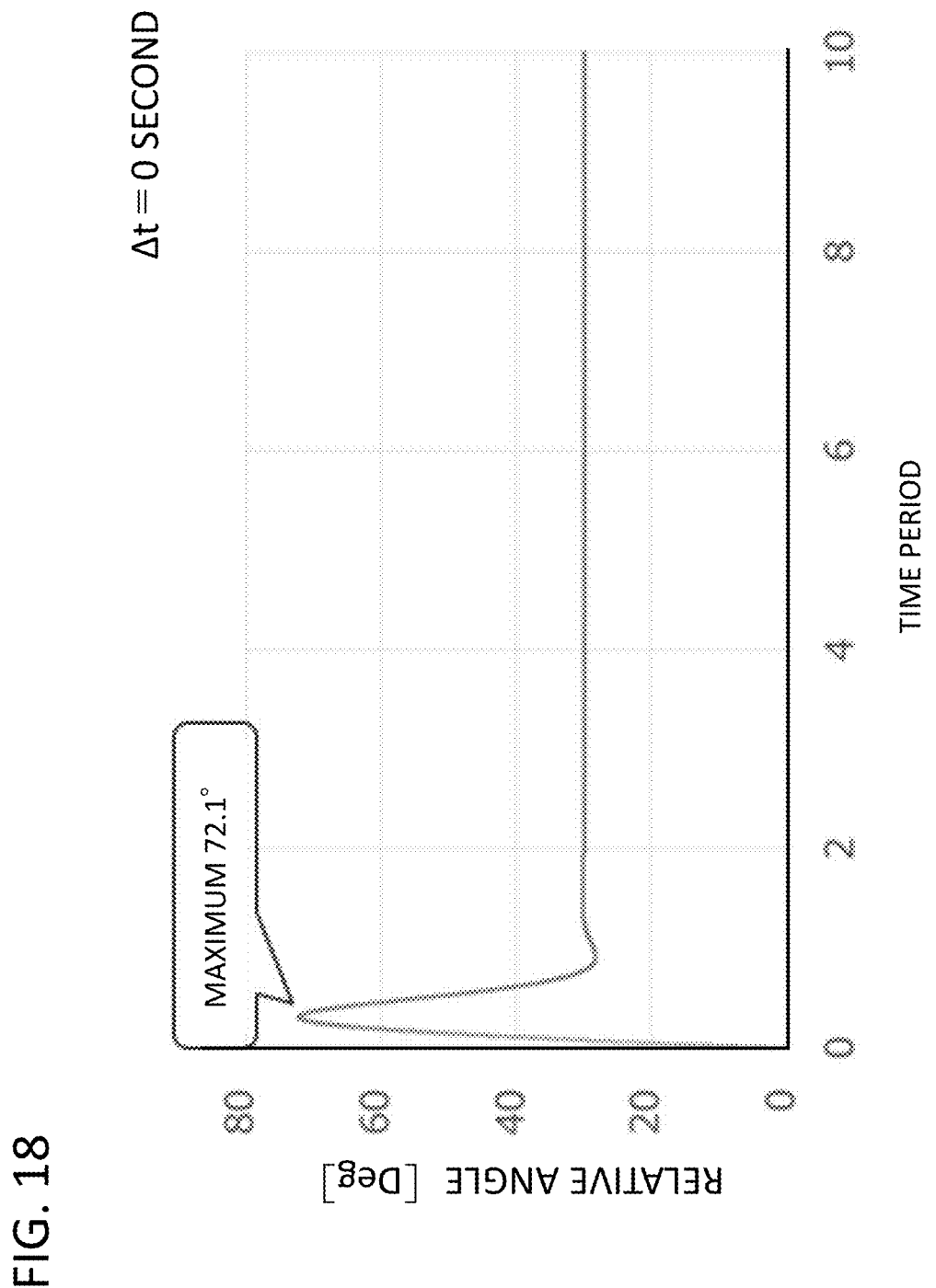
FIG. 18 is a graph showing a time-dependent change of a relative angle in traveling directions between the follower transport robot and the leader transport robot when the follower transport robot in the transport system according to a comparative example moves toward a position directly behind the leader transport robot after sequential Δt=0 seconds for each control cycle in a curve.
Figure 19:
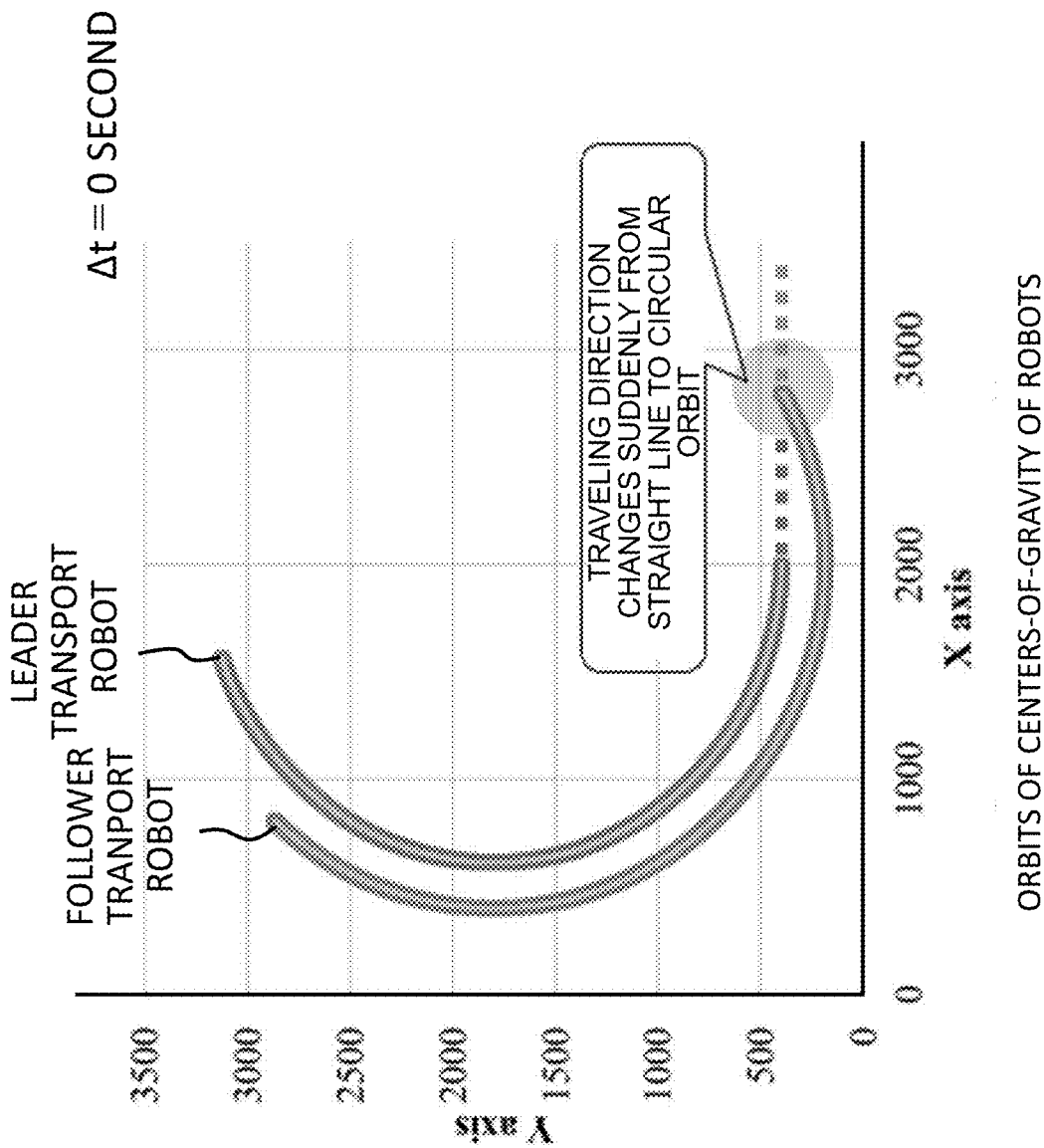
FIG. 19 is a graph showing orbits of centers of gravity of the follower transport robot and the leader transport robot when the follower transport robot in the transport system according to a comparative example moves toward a position directly behind the leader transport robot after sequential Δt=0 seconds for each control cycle in a curve.
Figure 20:
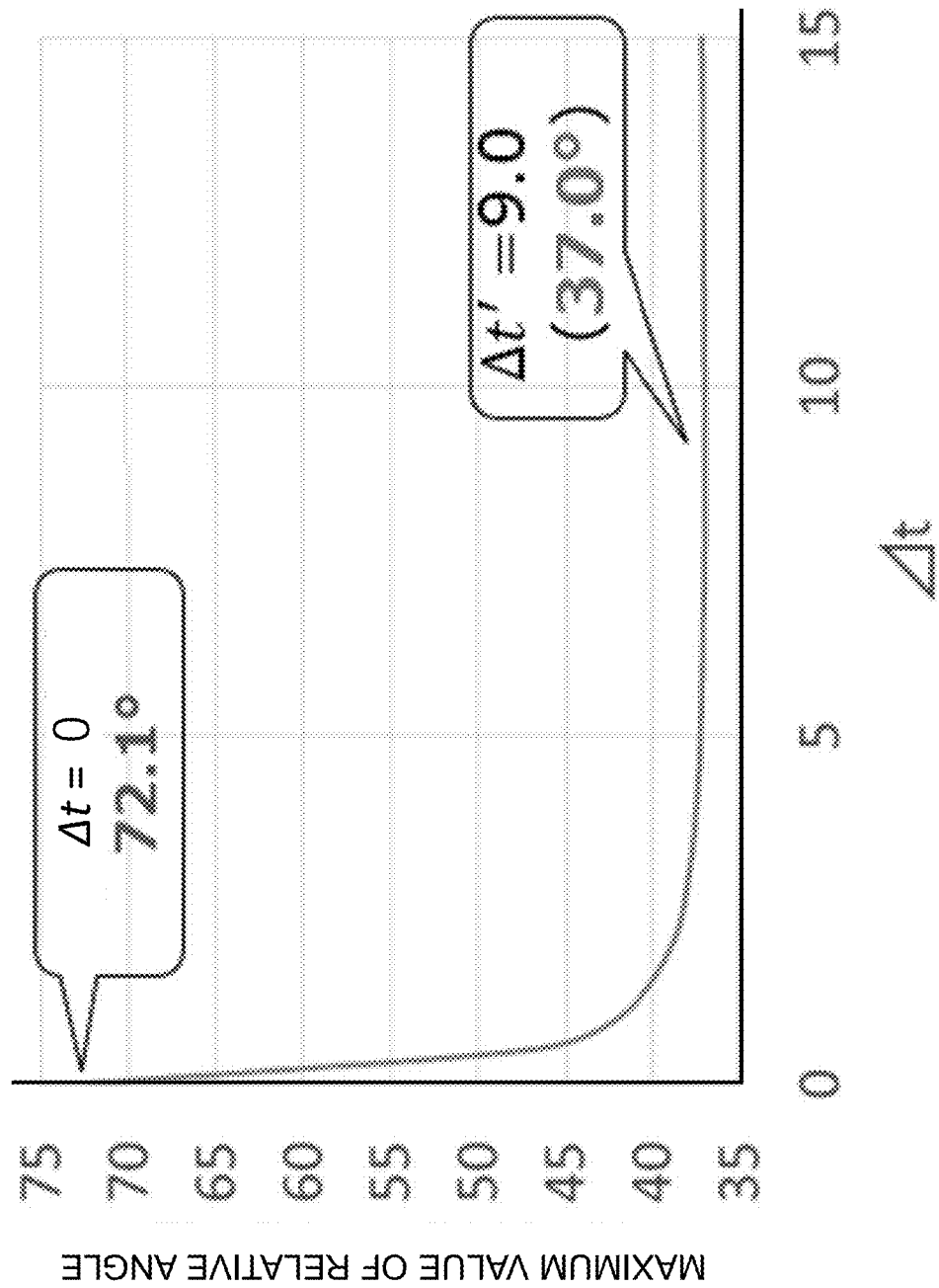
FIG. 20 is a graph showing maximum values of a relative angle of traveling directions between the follower transport robot and the leader transport robot when Δt is caused to change when the follower transport robot in the transport system according to the first exemplary embodiment moves toward a position directly behind the leader transport robot after sequential Δt second in each control cycle in a curve.

Next, an operation of the follower transport robot in the transport system according to the first exemplary embodiment will be described with reference to drawings. FIG. 9 is an image diagram schematically showing a pressing of the follower transport robot in the transport system according to the first exemplary embodiment. FIG. 10 is an image diagram schematically showing a state of insufficient pressing of the follower transport robot in the transport system according to the comparative example. FIG. 11 is an image diagram schematically showing a state in which the follower transport robot moves so as to reduce a relative angle in traveling directions between the transport robots in the transport system according to the first exemplary embodiment. FIG. 12 is an image diagram schematically showing a state in which a relative angle of traveling directions between the transport robots in the transport system according to the comparative example is large. FIG. 13 is an image diagram schematically showing a state in which the follower transport robot in the transport system according to the first exemplary embodiment presses from outside of an orbit of the leader transport robot in a curve. FIG. 14 is an image diagram schematically showing a state in which the follower transport robot in the transport system according to the comparative example presses from inside of the orbit of the leader transport robot in a curve. FIG. 15 is an image diagram schematically showing a case where the follower transport robot in the transport system according to the first exemplary embodiment moves toward a position directly behind the leader transport robot after sequential Δt (>0) for each control cycle in a curve. FIG. 16 is a graph showing a time-dependent change of a relative angle in traveling directions between the follower transport robot and the leader transport robot when the follower transport robot in the transport system according to the first exemplary embodiment moves toward a position directly behind the leader transport robot after sequential Δt=15 seconds for each control cycle in a curve. FIG. 17 is a graph showing orbits of centers of gravity of the follower transport robot and the leader transport robot when the follower transport robot in the transport system according to the first exemplary embodiment moves toward a position directly behind the leader transport robot after sequential Δt=15 seconds for each control cycle in a curve. FIG. 18 is a graph showing a time-dependent change of a relative angle in traveling directions between the follower transport robot and the leader transport robot when the follower transport robot in the transport system according to a comparative example moves toward a position directly behind the leader transport robot after sequential Δt=1 seconds for each control cycle in a curve. FIG. 19 is a graph showing orbits of centers of gravity of the follower transport robot and the leader transport robot when the follower transport robot in the transport system according to a comparative example moves toward a position directly behind the leader transport robot after sequential Δt=1 seconds for each control cycle in a curve. FIG. 20 is a graph showing maximum values of a relative angle of traveling directions between the follower transport robot and the leader transport robot when Δt is caused to change when the follower transport robot in the transport system according to the first exemplary embodiment moves toward a position directly behind the leader transport robot after sequential Δt second in each control cycle in a curve.

In the first exemplary embodiment, the follower transport robot 2B moves so as to press (push) the leader transport robot 2A together with the transport object 5 (see FIG. 9). As a comparative example, as shown in FIG. 10, when the follower transport robot 2B is insufficiently pressed, a gap is generated between the leader transport robot 2A and the transport object 5, and there is a possibility that the transport object 5 can not be properly controlled. On the other hand, in the first exemplary embodiment, as shown in FIG. 9, the follower transport robot 2B moves so as to press (push) the leader transport robot 2A together with the transport object 5, thereby it is possible to move without forming a gap as shown in FIG. 10, and the transport object 5 can be stably transported.

Also, in the first exemplary embodiment, the transport robots 2A and 2B move so as to reduce a relative angle in traveling directions between the leader transport robot 2A and the follower transport robot 2B (see FIG. 11). Here, as an element that a rotation angle of the contact part (30 in FIG. 1) and the rotation mechanism (40 in FIG. 1) are approximately represented, a relative angle in traveling directions between the leader transport robot 2A and the follower transport robot 2B is used. As a comparative example, as shown in FIG. 12, when a relative angle in traveling directions between the leader transport robot 2A and the follower transport robot 2B becomes large, a rotation angle of the contact part (30 in FIG. 1) and the rotation mechanism (40 in FIG. 1) become large; a force of sandwiching the transport object 5 between the transport robots 2A and 2B by pressing (pushing) of the follower transport robot 2B is insufficient; a friction force between the transport object 5 and the follower transport robot 2B is insufficient; and side slip occurs between the transport object 5 and the transport robots 2A and 2B, thereby there is a possibility that the transport object 5 cannot be stably transported. On the other hand, in the first exemplary embodiment, as shown in FIG. 11, when the transport robots 2A and 2B moves so that a relative angle in traveling directions between the leader transport robot 2A and the follower transport robot 2B becomes smaller in a curve, a rotation angle of the contact part (30 in FIG. 1) and the rotation mechanism (40 in FIG. 1) become small; a force of sandwiching the transport object 5 between the transport robots 2A and 2B by pressing (pushing) of the follower transport robot 2B can be secured; a friction force between the transport object 5 and the follower transport robot 2B can be secured; and side slip is avoid between the transport object 5 and the transport robots 2A and 2B, thereby the transport object 5 can be stably transported.

Further, in the first exemplary embodiment, the follower transport robot 2B moves along an orbit 83 so as to press (push) from outside of an orbit 82 of the leader transport robot 2A and moves toward a position (see virtual line 84) directly behind the leader transport robot 2A in a curve (see FIG. 13). As a comparative example, as shown in FIG. 14, when the follower transport robot 2B moves along an orbit 86 so as to push the transport object 5 from inside of an orbit 85 of the leader transport robot 2A in a curve, thereby the follower transport robot 2B inhibits a movement of the leader transport robot 2A, and there is a possibility that the leader transport robot 2A can not turn a curve. On the other hand, in the first exemplary embodiment, as shown in FIG. 13, the follower transport robot 2B moves so as to press (push) from outside of an orbit 82 of the leader transport robot 2A, and the follower transport robot 2B moves toward a position directly behind the leader transport robot 2A, thereby the follower transport robot 2B does not inhibit a movement of the leader transport robot 2A, and the leader transport robot 2A can turn a curve.

Here, a position directly behind the leader transport robot 2A is a position on a virtual line 84 in a traveling direction of the leader transport robot 2A that passes through a center-of-gravity (for example, a central axis of the shaft part (42 in FIG. 1) of the rotation mechanism (40 in FIG. 1)) of the leader transport robot 2A.

Further, in the first exemplary embodiment, the follower transport robot 2B predicts a position (position of star in FIG. 15) directly behind the leader transport robot 2A after Δt seconds (Δt>0, for example, 15 seconds) successively for each control cycle in a curve, and moves toward the predicted position (see FIGS. 15 to 17). As a comparative example, when Δt=1 seconds, a relative angle in traveling directions between the leader transport robot 2A and the follower transport robot 2B becomes 72.1° at the maximum (see FIG. 18), and a traveling direction of the follower transport robot 2B changes suddenly from straight to circular orbit (see FIG. 19). On the other hand, in the first exemplary embodiment, when Δt=15 seconds, a relative angle in traveling directions between the leader transport robot 2A and the follower transport robot 2B is 37.2° at the maximum (see FIG. 16), and a traveling direction of the follower transport robot 2B changes slowly from straight to circular orbit (see FIG. 17).

Furthermore, in the first exemplary embodiment, the follower transport robot 2B causes Δt to change when controlling as shown in FIG. 15; simulates a relative angle of traveling directions between the leader transport robot 2A and the follower transport robot 2B relative to each Δt; determines the shortest Δt (=Δt') when maximum values of a relative angle become minimum Δt (=Δt') or a preset threshold value or less (see FIG. 20); and moves so as to aim at a position directly behind the leader transport robot 2A after the determined Δt' second in each control cycle. For example, in the example of FIG. 20, a maximum value of a relative angle in traveling directions between the leader transport robot 2A and the follower transport robot 2B is 37.0°, which is the minimum value at Δt=9 seconds (=Δt'). As a result, a traveling direction of the follower transport robot 2B changes slowly from straight to circular orbit.

That is, in the first exemplary embodiment, a sequential target coordinate of the follower transport robot 2B is set directly behind a position where the leader transport robot 2A is located after Δt (>0) seconds. Since an orbit of the follower transport robot 2B changes according to the value of Δt, a maximum value of a relative angle in traveling directions between the leader transport robot 2A and the follower transport robot 2B also changes. Therefore, for each control cycle, a sequential target coordinate of the follower transport robot 2B is determined by the following procedure, and the follower transport robot 2B is advanced toward the target coordinate.

That is, (1) Δt is changed, and a maximum value of a relative angle between the follower transport robot 2B and the leader transport robot 2A is calculated relative to each Δt. (2) Let Δt which minimizes a maximum value of the calculated relative angle be Δt'. (3) A target coordinate of the follower transport robot 2B is set directly behind a position where the leader transport robot 2A is located after Δt', and the follower transport robot 2B is moved.

Figure 21:
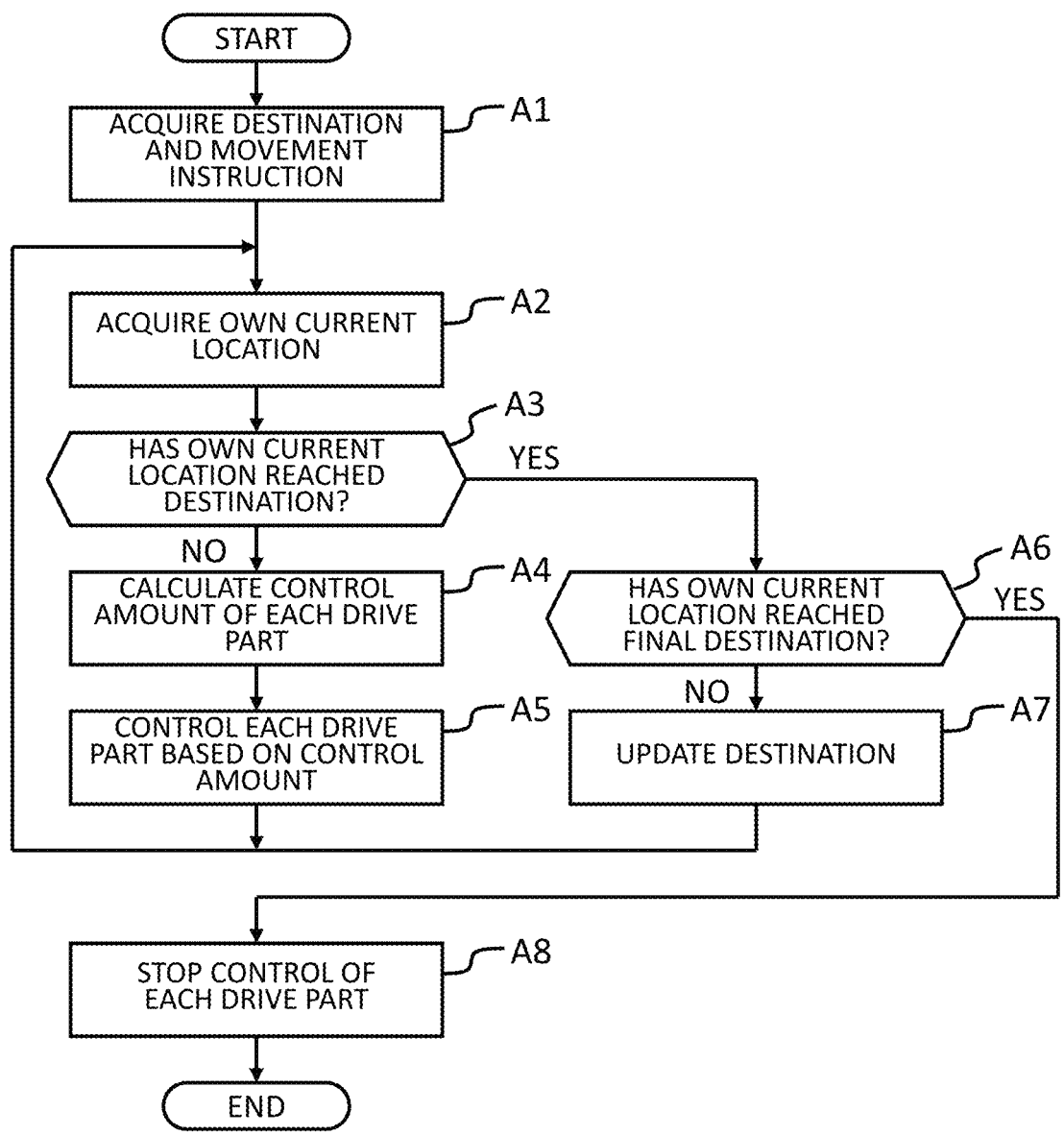
FIG. 21 is a flowchart schematically showing an operation of the leader transport robot in the transport system according to the first exemplary embodiment.

Next, an operation of the leader transport robot in the transport system according to the first exemplary embodiment will be described with reference to drawings. FIG. 21 is a flowchart schematically showing an operation of the leader transport robot in the transport system according to the first exemplary embodiment. Please refer to FIG. 3 as to the configuration parts of the transport robot.

First, the control part 16 of the leader transport robot 2A acquires information of a destination (including intermediate destination and final destination) and a movement instruction from outside (not shown; for example, an information communication terminal capable of near field communication, a network to which an information processing apparatus is connected) through the communication part 17 (step A1).

After step A1, the control part 16 of the leader transport robot 2A starts a control loop of the drive parts 12 and 13 in a predetermined time period (for example, several tens of ms) (steps A2 to A7).

After step A1, after step A5, or after step A7, in the control loop, the control part 16 of the leader transport robot 2A acquires information (for example, position coordinates) of an own current location of the leader transport robot 2A (step A2). Here, the own current location may be acquired from outside through the communication part 17; may be calculated and acquired by oneself based on control histories of the drive parts 12 and 13; or may be acquired from a position detection part (not shown; for example, a GPS (Global Positioning System) receiver, a beacon receiver, etc.) comprised in the leader transport robot 2A.

Next, in the control loop, the control part 16 of the leader transport robot 2A determines whether or not the acquired own current location has reached (for example, has been in a predetermined radius of the destination) the acquired destination (the nearest destination in front) (step A3). When the destination has been reached (YES in step A3), the process proceeds to step A6.

When the destination has not been reached (NO in step A3), in the control loop, the control part 16 of the leader transport robot 2A calculates control amounts of the drive parts 12 and 13 (for example, rotation velocities of the wheels 20 and 21). (step A4).

Next, in the control loop, the control part 16 of the leader transport robot 2A controls the drive parts 12 and 13 based on the calculated control amounts (step A5), and then returns to step A2.

When the destination has been reached (YES in step A3), in the control loop, the control part 16 of the leader transport robot 2A determines whether or not the own current location has reached a final destination (for example, has been in a predetermined radius of the final destination).(step A6). When the final destination has been reached (YES in step A6), the process proceeds to step A8.

When the final destination has not been reached (NO in step A6), in the control loop, the control part 16 of the leader transport robot 2A updates a destination to the nearest destination in front (step A7), and then returns to step A2.

When the final destination has reached (YES in step A6), the control part 16 of the leader transport robot 2A goes out of the control loop, stops controls of the drive parts 12 and 13 (step A8), and then ends.

In the operation of FIG. 21, the control part 16 of the leader transport robot 2A transmits latest information of an own current location (for example, position coordinate), a direction (for example, traveling direction) and control amounts (for example, rotation velocity) of the left and right wheels 20 and 21, to the follower transport robot 2B through the communication part 17 according to a request from the follower transport robot 2B, or periodically or automatically. Also, although an operation of the leader transport robot 2A has been described in FIG. 21, the same operation as in FIG. 21 may be performed when the transport robot moves independently.

Figure 22:
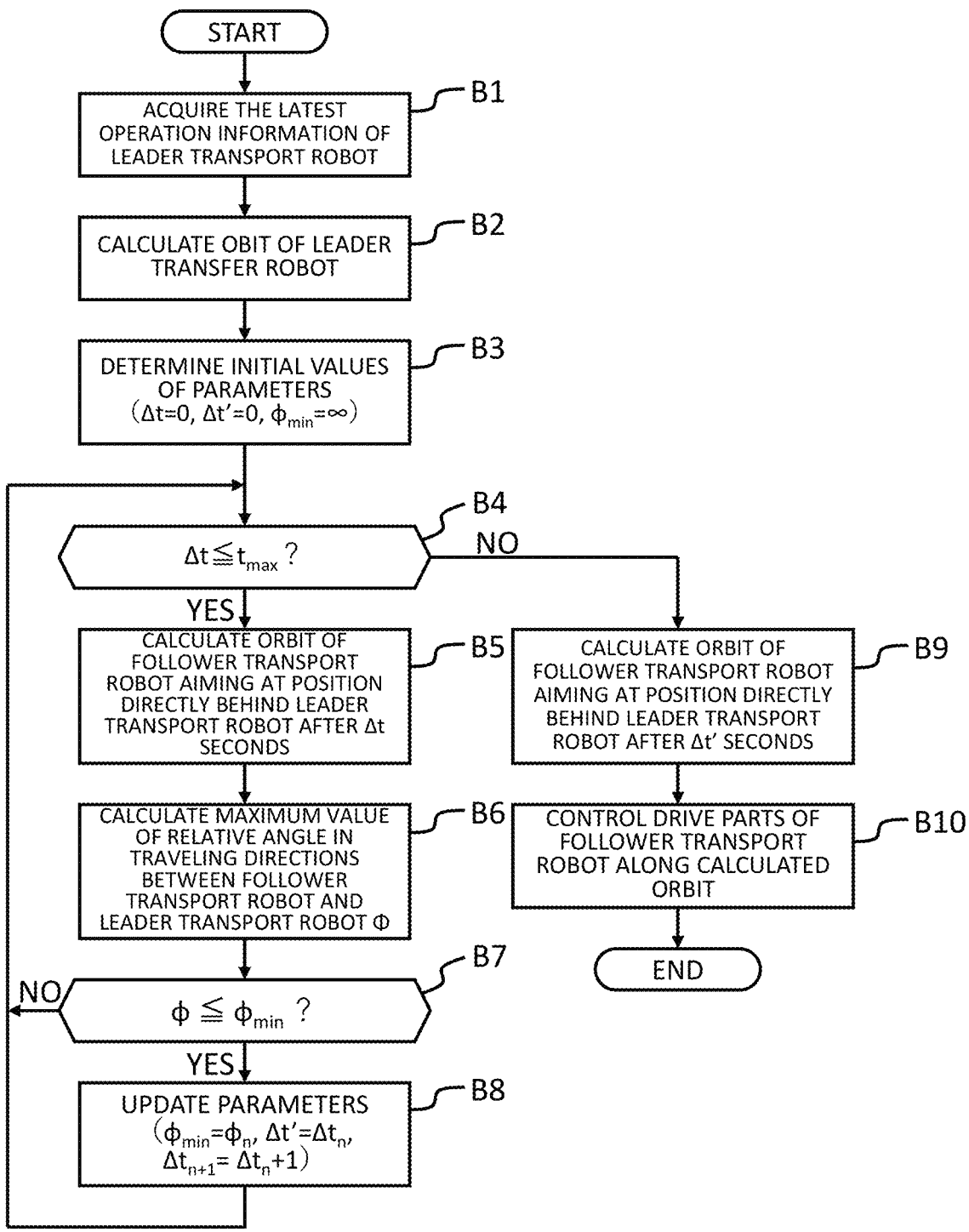
FIG. 22 is a flowchart schematically showing an operation of the follower transport robot in the transport system according to the first exemplary embodiment.

Next, an operation of the follower transport robot in the transport system according to the first exemplary embodiment will be described with reference to drawings. FIG. 22 is a flowchart schematically showing an operation of the follower transport robot in the transport system according to the first exemplary embodiment. Please refer to FIG. 4 as to configuration parts of the follower transport robot 2B.

First, the leader transport robot orbit calculation part 16a of the follower transport robot 2B acquires latest information (latest operation information of the leader transport robot 2A) of a current location (for example, position coordinate), direction (for example, traveling direction) of the leader transport robot 2A, and control amounts (for example, rotation velocities) of the drive parts 12 and 13 of the left and right wheels 20 and 21 (step B1). Here, the latest operation information of the leader transport robot 2A may be acquired by requesting the leader transport robot 2A from the leader transport robot orbit calculation part 16a, or may be acquired periodically or automatically without requesting from the leader transport robot 2A.

Next, the leader transport robot orbit calculation part 16a of the follower transport robot 2B calculates (predicts) an orbit (future orbit) of the leader transport robot 2A based on the acquired latest operation information of the leader transport robot 2A (step B2).

Next, the parameter determination part 16b of the follower transport robot 2B determines initial values ($\Delta t=0$, $\Delta t'=0$, $\phi_{min}=\infty$) of the parameters for calculating (predicting) an orbit (future orbit) of the follower transport robot 2B (step B3).

Here, $\Delta t$ is an elapsed time period from a time point of a current location of the leader transport robot 2A or the follower transport robot 2B, which is determined or updated by the parameter determination part 16b. $\Delta t'$ is a $\Delta t$ (elapsed time period from a time point of a current location of the leader transport robot 2A or the follower transport robot 2B) when maximum values of a relative angle in traveling directions between the leader transport robot 2A and the follower transport robot 2B become minimum, which is determined or updated by the parameter determination part 16b. $\phi_{min}$ is a relative angle when a maximum value of a relative angle in traveling directions between the leader transport robot 2A and the follower transport robot 2B becomes a minimum, which is determined or updated by the parameter determination part 16b.

After step B3, when $\phi$ is larger than $\phi_{min}$ (NO in step B7), or after step B8, the parameter determination part 16b of the follower transport robot 2B determines whether or not the latest $\Delta t$ is a preset $t_{max}$ or less (step B4). When $\Delta t$ is larger than $t_{max}$ (NO in step B4), the process proceeds to step B9.

Here, $\Delta t$ is the latest $\Delta t$, and as $\Delta t$, an initial value 0 is used when the initial value 0 is the latest, an updated latest $\Delta t$ is used when $\Delta t$ is updated.

When $\Delta t$ is $t_{max}$ or less (YES in step B4), the follower transport robot orbit calculation part 16c of the follower transport robot 2B calculates (predicts) an orbit (future orbit) of the follower transport robot 2B when the follower transport robot 2B moves toward a position directly behind the leader transport robot 2A after $\Delta t$ from a time point of the current location based on the orbit of the leader transport robot 2A calculated by the leader transport robot orbit calculation part 16a, and the latest Δt determined (or updated) in the parameter determination part 16b (step B5). Here, the orbit of the follower transport robot 2B is an orbit such that the follower transport robot 2B presses from outside of an orbit of the leader transport robot 2A in a curve and the follower transport robot 2B aims a position directly behind the leader transport robot 2A.

Next, the relative angle calculation part 16d of the follower transport robot 2B calculates (predicts) a maximum value φ of a relative angle in traveling directions between the leader transport robot 2A and the follower transport robot 2B based on the orbit of the leader transport robot 2A calculated by the leader transport robot orbit calculation part 16a, and the latest orbit of the follower transport robot 2B calculated by the follower transport robot orbit calculation part 16c (step B6).

Next, the parameter determination part 16b of the follower transport robot 2B determines whether or not the latest maximum value φ of a relative angle in traveling directions between the leader transport robot 2A and the follower transport robot 2B calculated by the relative angle calculation part 16d is the latest $\phi_{min}$ determined or updated, or less (step B7). When φ is larger than $\phi_{min}$ (NO in step B7), the process returns to step B4.

Here, when $\phi_{min}$ is the latest $\phi_{min}$, and the initial value ∞ is the latest, the initial value ∞ is used, and when $\phi_{min}$ is updated, the updated latest $\phi_{min}$ is used.

When φ is $\phi_{min}$ or less (YES in step B7), the parameter determination part 16b of the follower transport robot 2B updates parameter values ($\phi_{min}$, Δt', Δt) for calculating (predicting) an orbit (future orbit) of the follower transport robot 2B (step B8), and then the process returns to step B4.

That is, in step B8, $\phi_{min}$ is updated to the latest $\phi_n$; Δt is updated to $\Delta t_{n+1}$ that is a value obtained by plus a predetermined value (for example, 1 second) to the latest $\Delta t_n$; and Δt' is updated to the latest $\Delta t_n$. For example, in a first update, it is updated as $\phi_{min}=\phi_0$, Δt'=Δt$_0$=0, and Δt$_1$=Δt$_0$+1=1; in the second update, it is updated as $\phi_{min}=\phi_1$, Δt'=Δt$_1$=1, and Δt$_2$=Δt$_1$+1=2; and they are updated in other cases as well.

When Δt is larger than $t_{max}$ (NO in step B4), the follower transport robot orbit calculation part 16c of the follower transport robot 2B calculates (predicts) an orbit (future orbit) of the follower transport robot 2B when the follower transport robot 2B moves toward a position directly behind the leader transport robot 2A after the Δt' from a time point at a current location based on the orbit of the leader transport robot 2A calculated by the leader transport robot orbit calculation part 16a and the latest Δt' updated in the parameter determination part 16b (step B9).

Next, the drive control part 16e of the follower transport robot 2B controls the drive parts 12 and 13 so as to move along the orbit of the follower transport robot 2B calculated by the follower transport robot orbit calculation part 16c (step B10), then ends one control loop, and the process returns to the start to perform a next control loop.

In FIG. 22, although a control is performed regardless of curve or straight, a control may be started before a curve and ended after the curve. By controlling only during a curve, there is a time interval, so blurring can be reduced, and amounts of calculation and communication can be reduced.

According to the first exemplary embodiment, it is possible to contribute to stable transportation of a transport object as it is without modifying various types of transport object and without reloading the transport object. In particular, by controlling the follower transport robot 2B so as to push the transport object 5 from outside of an orbit of the leader transport robot 2A, the transport object 5 can be stably transported.

Second Exemplary Embodiment

Figure 23:
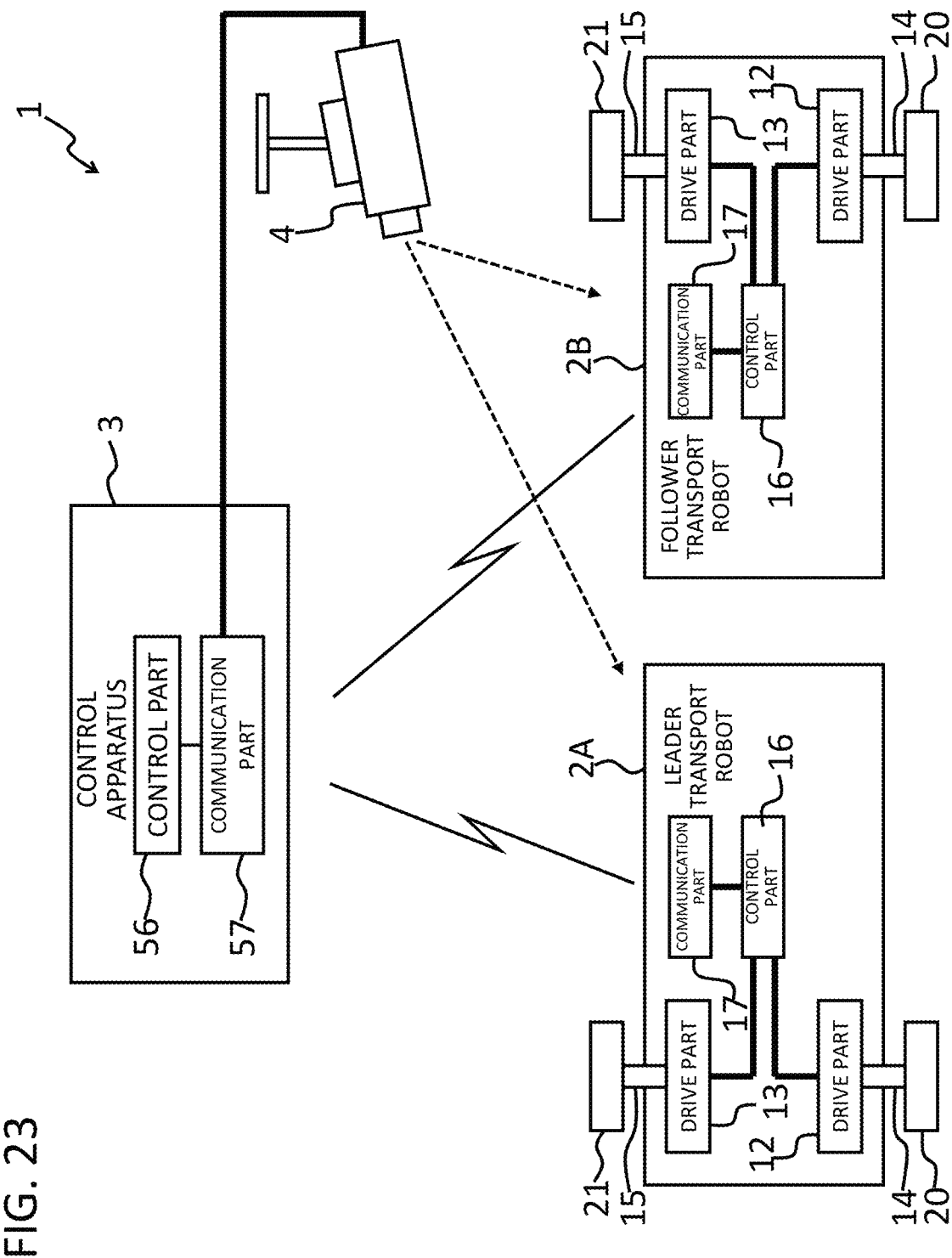
FIG. 23 is a block diagram schematically showing a configuration of a transport system according to a second exemplary embodiment.
Figure 24:
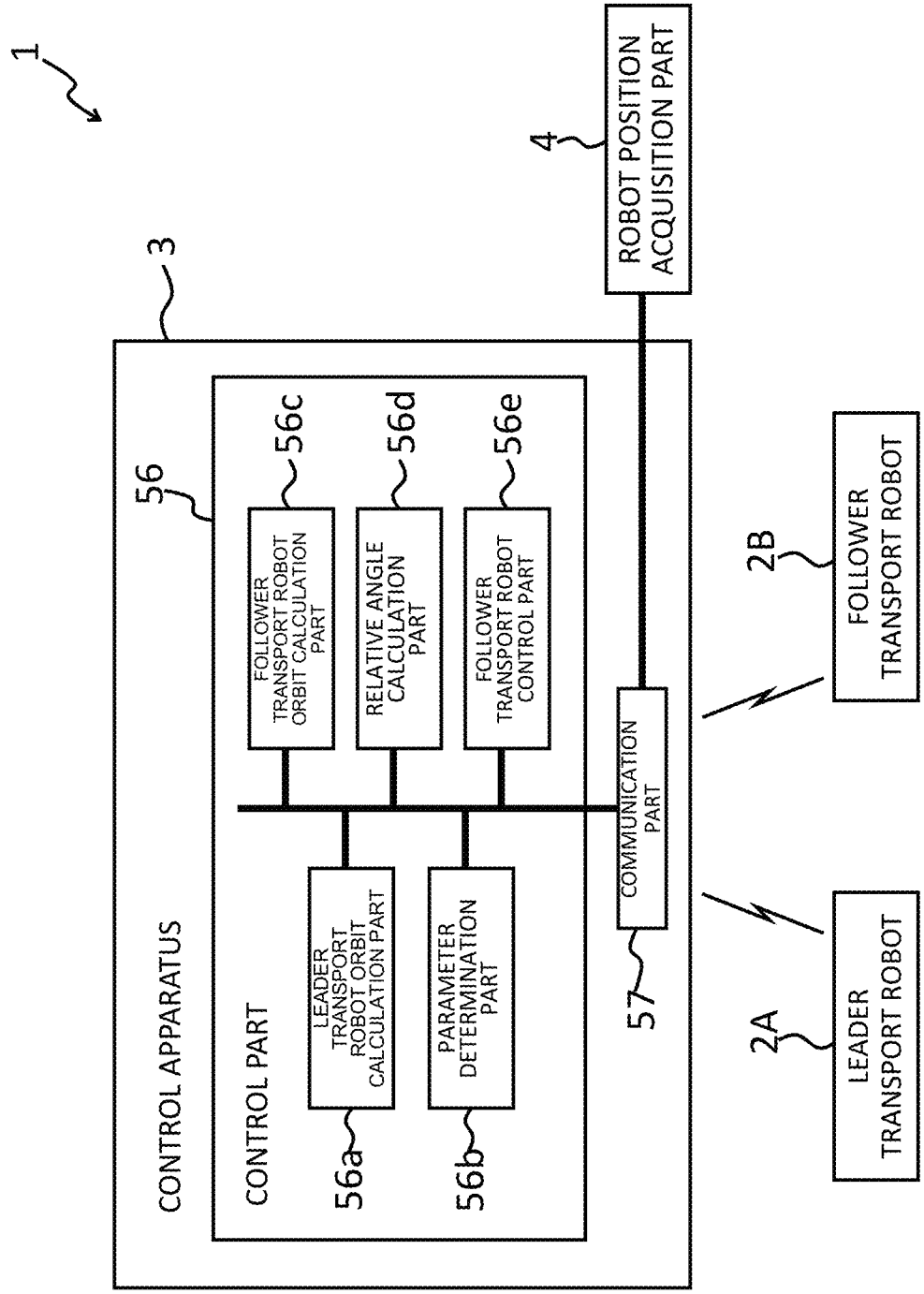
FIG. 24 is a block diagram schematically showing a configuration of a control apparatus in the transport system according to the second exemplary embodiment.
Figure 25:
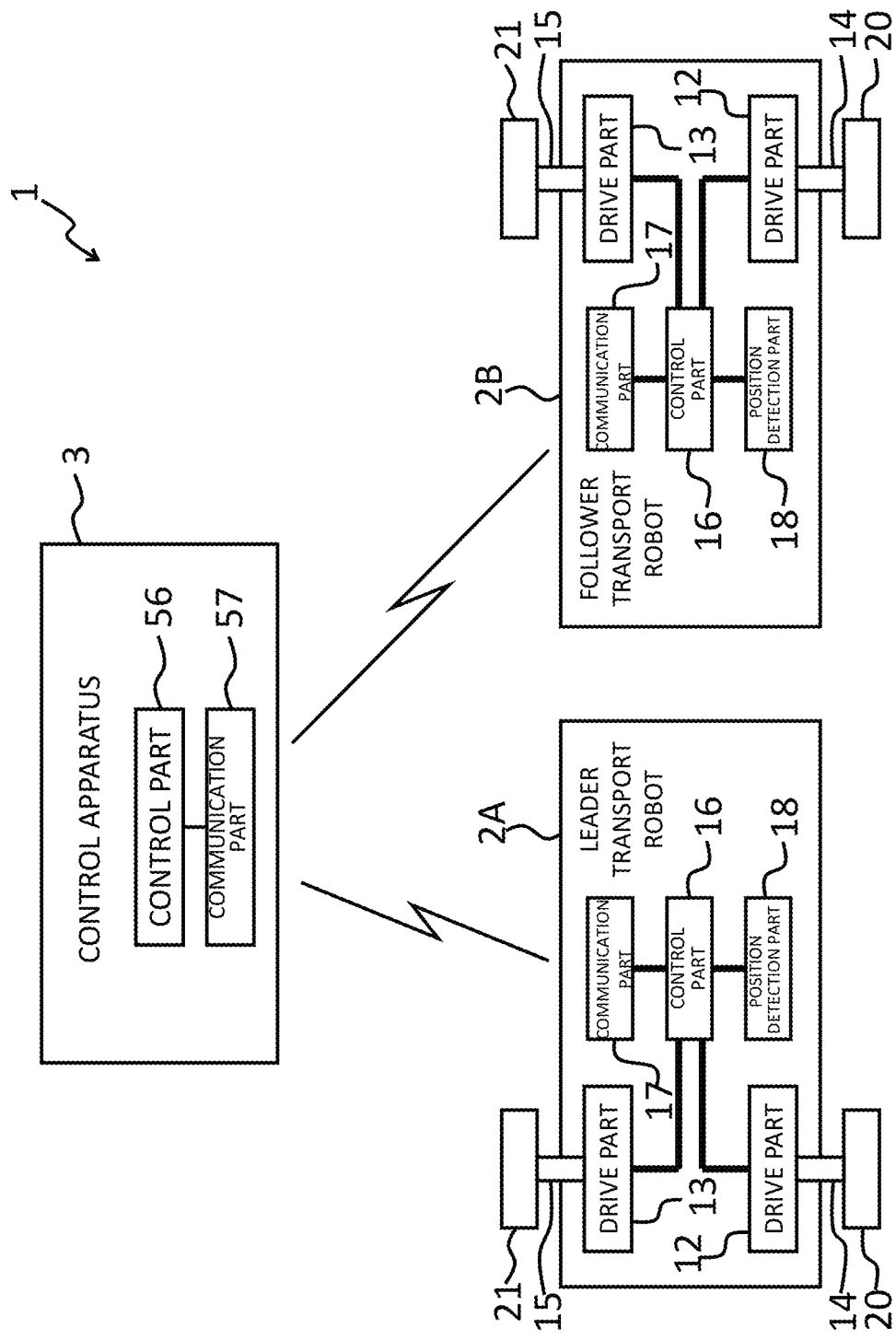
FIG. 25 is a block diagram schematically showing a modified example of the configuration of the transport system according to the second exemplary embodiment.

A transport system according to a second exemplary embodiment will be described with reference to drawings. FIG. 23 is a block diagram schematically showing a configuration of the transport system according to the second exemplary embodiment. FIG. 24 is a block diagram schematically showing a configuration of a control apparatus in the transport system according to the second exemplary embodiment. FIG. 25 is a block diagram schematically showing a modified example of a configuration of the transport system according to the second exemplary embodiment.

The second exemplary embodiment is a modification of the first exemplary embodiment; is configured to perform a process (corresponding to steps A1 to A8 in FIG. 21 and steps B1 to B10 in FIG. 22) for calculating control amounts of the drive parts 12 and 13 of the transport robots 2A and 2B by the control apparatus 3 instead of the transport robots 2A and 2B; and provides a robot position acquisition apparatus 4 (camera in FIG. 23) for acquiring positions (position information) of the transport robots 2A and 2B. Although an example in which the control apparatus 3 controls both the transport robots 2A and 2B is described here, only one of the transport robots 2A and 2B may be controlled.

The transport robots 2A and 2B are robots that transport the transport object 5 in a state that sandwiched the transport object 5 by collaborating (cooperating) with each other when transporting a transport object (corresponding to 5 in FIGS. 5 and 6). (See FIGS. 23 and 24). As the transport robots 2A and 2B, the same transport robots as the transport robots of the first exemplary embodiment (2 (2A, 2B) in FIGS. 1 to 3) can be used. The control parts 16 of the transport robots 2A and 2B do not perform processing (corresponding to steps A1 to A8 in FIG. 21 and steps B1 to B10 in FIG. 22) for calculating control amounts of own drive parts 12 and 13, to control the own drive parts 12 and 13 (of the transport robots 2A and 2B) by receiving a control signal according to control amounts of the drive parts 12 and 13 of the transport robots 2A and 2B calculated by the control apparatus 3 from the control apparatus 3 through the communication part 17 of the transport robots 2A and 2B.

The control apparatus 3 is an apparatus that manages and controls the transport robots 2A and 2B (see FIGS. 23 and 24). The control apparatus 3 comprises: a communication part 57; and a control part 56. The communication part 57 is a function part that enables communication with the transport robots 2A and 2B. The control part 56 is a function part that controls the transport robots 2A and 2B. As the control part 56, for example, a computer apparatus comprising a memory, a processor, and the like can be used.

The control part 56 starts a control of the leader transport robot 2A (or the transport robot 2 that moves independently), when acquiring a destination (including an intermediate destination(s) and a final destination), and a movement instruction from outside (not shown; for example, an information communication terminal capable of near field communication, a network to which an information processing apparatus is connected) through the communication part 57. The control part 56 controls the leader transport robot 2A in a control loop for a predetermined time period (for example, several tens of ms). In the control loop, first, the control part 56 acquires a current location of the leader transport robot 2A from the robot position acquisition apparatus 4 through the communication part 57. Here, the current location of the leader transport robot 2A may not only be acquired from the robot position acquisition apparatus 4, but may also be calculated and acquired based on control histories of the drive parts 12 and 13 of the leader transport robot 2A, and may be acquired from the position detection part 18 (see FIG. 25; for example, GPS (Global Positioning System) receiver, beacon receiver, etc.) comprised in the robot 2A through the control part 56 and the communication part 57. In the control loop, the control part 56 determines whether or not the acquired current location of the leader transport robot 2A has reached the input destination (the nearest destination in front). When the current location of the leader transport robot 2A has not reached the destination, the control part 56 calculates control amounts (for example, the rotation velocities of the wheels 20 and 21) of the drive parts 12 and 13 of the leader transport robot 2A in the control loop; controls (transmits control signals according to the control amount to the leader transport robot 2A) the leader transport robot 2A based on the calculated control amount; and then acquires a current location of the leader transport robot 2A again and will continue the control loop. When the current location of the leader transport robot 2A reaches the destination, the control part 56 determines whether or not the current location of the leader transport robot 2A has reached the final destination. When the current location of the leader transport robot 2A has not reached the final destination, the control part 56 updates a destination to a nearest destination in front. When the current location of the leader transport robot 2A reaches the final destination, the control part 56 stops a control of the leader transport robot 2A. The control part 56 acquires information of a current location (for example, position coordinate), a direction (for example, traveling direction), and control amounts (for example, rotation velocity) of the left and right wheels 20 and 21 of the leader transport robot 2A from the leader transport robot 2A through the communication part 57.

In a control of the follower transport robot 2B, the control part 56 realizes: a leader transport robot orbit calculation part 56a; a parameter determination part 56b; s follower transport robot orbit calculation part 56c; a relative angle calculation part 56d; and a follower transport robot control part 56e (see FIG. 24), by executing a program for the follower transport robot 2B.

The leader transport robot orbit calculation part 56a is a processing part that calculates (predicts) an orbit of the leader transport robot 2A (see FIG. 24). The leader transport robot orbit calculation part 56a acquires (receives) the latest information (the latest operation information of leader transport robot 2A) of a current location (for example, position coordinate), a direction (traveling direction), and control amounts (rotation velocities) of the left and right wheels 20 and 21 of the leader transport robot 2A, and calculates (predicts) an orbit of the leader transport robot 2A based on the acquired latest operation information. The acquired information can be acquired from the control part 56 of the control apparatus 3 that controls the leader transport robot 2A, but may be acquired from the leader transport robot 2A or the robot position acquisition apparatus 4.

The parameter determination part 56b is a processing part that determines parameters for calculating an orbit of the follower transport robot 2B (see FIG. 24). Here, as parameters: a value $\phi_{min}$ that minimizes maximum values of relative angle in traveling directions between the leader transport robot 2A and the follower transport robot 2B after an arbitrary time period has elapsed from a time point of a current location; a time period $\Delta t$ after updating in the arbitrary time period; and a time period $\Delta t'$ before updating in the arbitrary time can be used. An initial value of $\phi_{min}$ is $\infty$, and when the latest $\phi$ calculated by a relative angle calculation part 56d is $\phi_{min}$ or less, $\phi_{min}$ is updated to $\phi$. An initial value of $\Delta t$ is 0, and when the latest $\phi$ calculated by a relative angle calculation part 56d is $\phi_{min}$ or less, $\Delta t$ is updated to a value obtained by adding a predetermined value (for example, 1 second) to the latest $\Delta t$. An initial value of $\Delta t'$ is 0, and when the latest $\phi$ calculated by a relative angle calculation part 56d is the latest $\phi_{min}$ or less, $\Delta t'$ is updated to the latest $\Delta t$. The parameter determination part 56b updates parameters ($\phi_{min}$, $\Delta t$, $\Delta t'$). The parameter determination part 56b determines whether or not the latest determined (or updated) $\Delta t$ is a preset $t_{max}$ or less. The parameter determination part 56b determines whether or not the latest maximum value $\phi$ of a relative angle in traveling directions between the leader transport robot 2A and the follower transport robot 2B calculated by a relative angle calculation part 56d is the latest determined (or updated) $\phi_{min}$ or less.

The follower transport robot orbit calculation part 56c is a processing part that calculates (predicts) an orbit of the follower transport robot 2B (see FIG. 24). The follower transport robot orbit calculation part 56c calculates (predicts) an orbit of the follower transport robot 2B when the follower transport robot 2B moves toward a position directly behind the leader transport robot 2A after the $\Delta t$ based on the orbit of the leader transport robot 2A calculated by the leader transport robot orbit calculation part 56a and the latest $\Delta t$ determined (or updated) by the parameter determination part 56b. When the latest $\Delta t$ is larger than $t_{max}$, the follower transport robot orbit calculation part 56c calculates (predicts) an orbit of the follower transport robot 2B when the follower transport robot 2B moves toward a position directly behind the leader transport robot 2A after the $\Delta t'$ based on the orbit of the leader transport robot 2A calculated by the leader transport robot orbit calculation part 56a, and the latest $\Delta t'$ determined (or updated) by the parameter determination part 56b.

The relative angle calculation part 56d is a processing part that calculates a relative angle in traveling directions between the leader transport robot 2A and the follower transport robot 2B (see FIG. 24). The relative angle calculation part 56d calculates (predicts) a maximum value $\phi$ of a relative angle in traveling directions between the leader transport robot 2A and the follower transport robot 2B based on the orbit of the leader transport robot 2A calculated by the leader transport robot orbit calculation part 56a and the latest orbit of the follower transport robot 2B calculated by the follower transport robot orbit calculation part 56c.

The follower transport robot control part 56e is a processing part that controls the follower transport robot 2B (see FIG. 24). The follower transport robot control part 56e controls the follower transport robot 2B based on the orbit of the follower transport robot 2B (the orbit of the follower transport robot 2B when the follower transport robot 2B moves toward a position directly behind the leader transport robot 2A after $\Delta t'$) calculated by the follower transport robot orbit calculation part 56c.

The robot position acquisition apparatus 4 is an apparatus that acquires information (current location and direction) of positions of the leader transport robot 2A and the follower transport robot 2B (see FIGS. 23 and 24). The robot position acquisition apparatus 4 can acquire information of positions of the leader transport robot 2A and the follower transport robot 2B by performing image processing using, for example, a camera. In this case, the image processing may be performed by the control apparatus 3 instead of the robot position acquisition apparatus 4. The robot position acquisition apparatus 4 outputs the acquired information toward the control apparatus 3.

Figure 26:
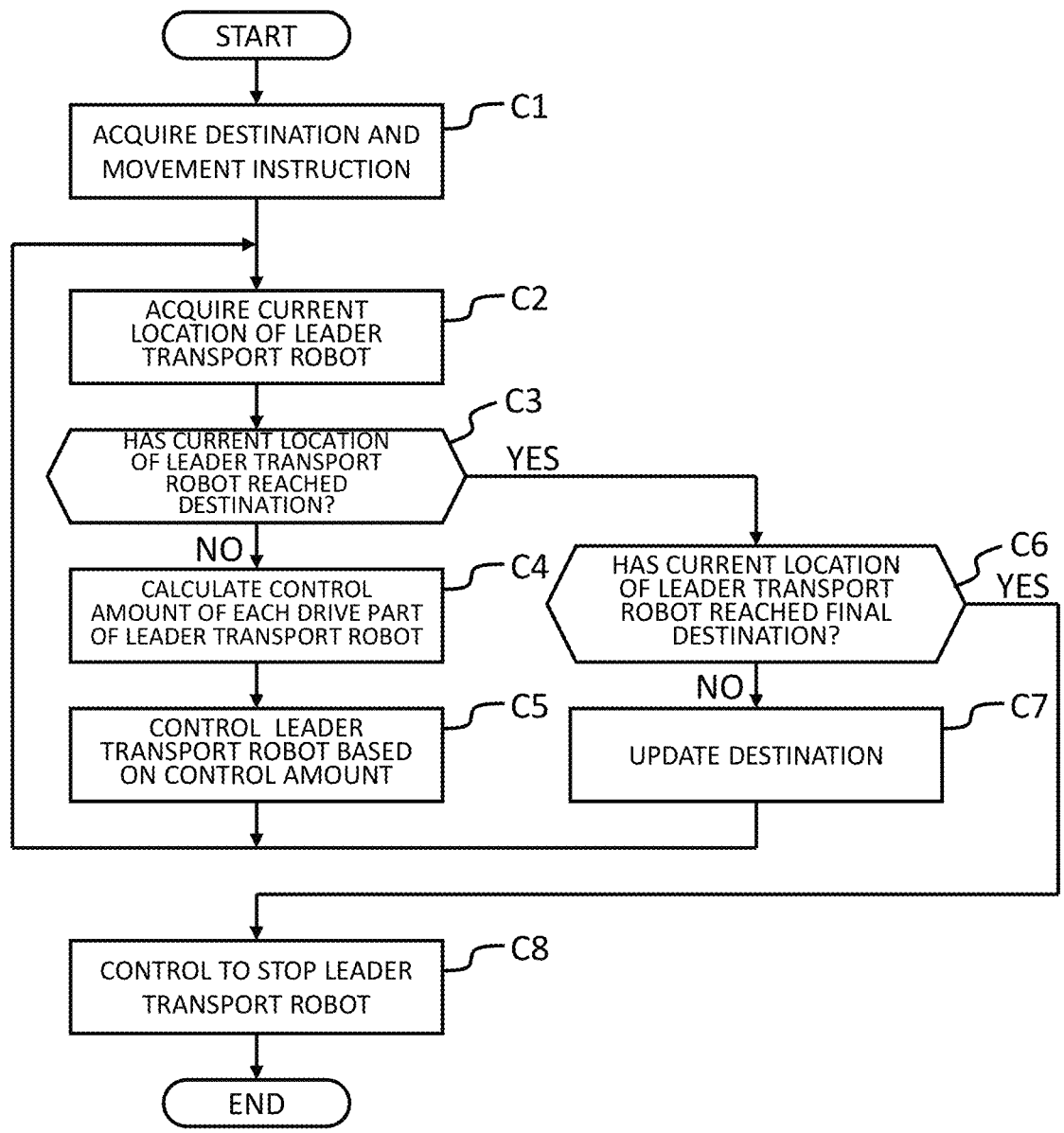
FIG. 26 is a flowchart schematically showing an operation when the control apparatus in the transport system according to the second exemplary embodiment controls the leader transport robot.

Next, an operation when the control apparatus in the transport system according to the second exemplary embodiment controls the leader transport robot will be described with reference to drawings. FIG. 26 is a flowchart schematically showing an operation when the control apparatus in the transport system according to the second exemplary embodiment controls the leader transport robot. Please refer to FIGS. 23 and 24 as to the configuration of the transport system 1.

First, the control part 56 of the control apparatus 3 acquires information of a destination (including intermediate destination(s) and final destination) and a movement instruction from outside (not shown; for example, an information communication terminal capable of near field communication, a network to which an information processing apparatus is connected) through the communication part 57 (step C1).

After step C1, the control part 56 of the control apparatus 3 starts a control loop of the leader transport robot 2A at a predetermined time period (for example, several tens of ms) (steps C2 to C7).

After step C1, after step C5, or after step C7, in the control loop, the control part 56 of the control apparatus 3 acquires information (for example, position coordinate) of a current location of the leader transport robot 2A. (step C2). Here, the current location of the leader transport robot 2A may be acquired from the robot position acquisition apparatus 4 through the communication part 57; may be calculated and acquired by the leader transport robot 2A based on control histories of the drive parts 12 and 13 of the leader transport robot 2A; and may be acquired from the leader transport robot 2A, or may be acquired from a position detection part (not shown; for example, a GPS (Global Positioning System) receiver, a beacon receiver, etc.) comprised in the leader transport robot 2A.

Next, in the control loop, the control part 56 of the control apparatus 3 determines whether or not the acquired current location of the leader transport robot 2A has reached (for example, existed within a predetermined radius of the destination) the acquired destination (for example, the nearest destination in front) (step C3). When the destination has been reached (YES in step C3), the process proceeds to step C6.

When the destination has not been reached (NO in step C3), in the control loop, the control part 56 of the control apparatus 3 calculates control amounts (for example, rotation velocities of the wheels 20 and 21) of the drive parts 12 and 13 of the leader transport robot 2A (step C4).

Next, in the control loop, the control part 56 of the control apparatus 3 controls the drive parts 12 and 13 of the leader transport robot 2A based on the calculated control amounts (step C5), and then returns to step C2.

When the destination has been reached (YES in step C3), in the control loop, the control part 56 of the control apparatus 3 determines whether or not the current location of the leader transport robot 2A has reached (for example, existed within a predetermined radius of the final destination) the final destination (step C6). When the final destination has been reached (YES in step C6), the process proceeds to step C8.

When the final destination has not been reached (NO in step C6), in the control loop, the control part 56 of the control apparatus 3 updates a destination to the nearest destination in front (step C7), and then returns to step C2.

When the final destination has reached (YES in step C6), the control part 56 of the control apparatus 3 goes out of the control loop and stops controls of the drive parts 12 and 13 of the leader transport robot 2A (step C8), and then ends.

Although an operation when controlling the leader transport robot 2A is described in FIG. 26, the same operation as in FIG. 26 may be performed when controlling the transport robot that moves independently.

Figure 27:
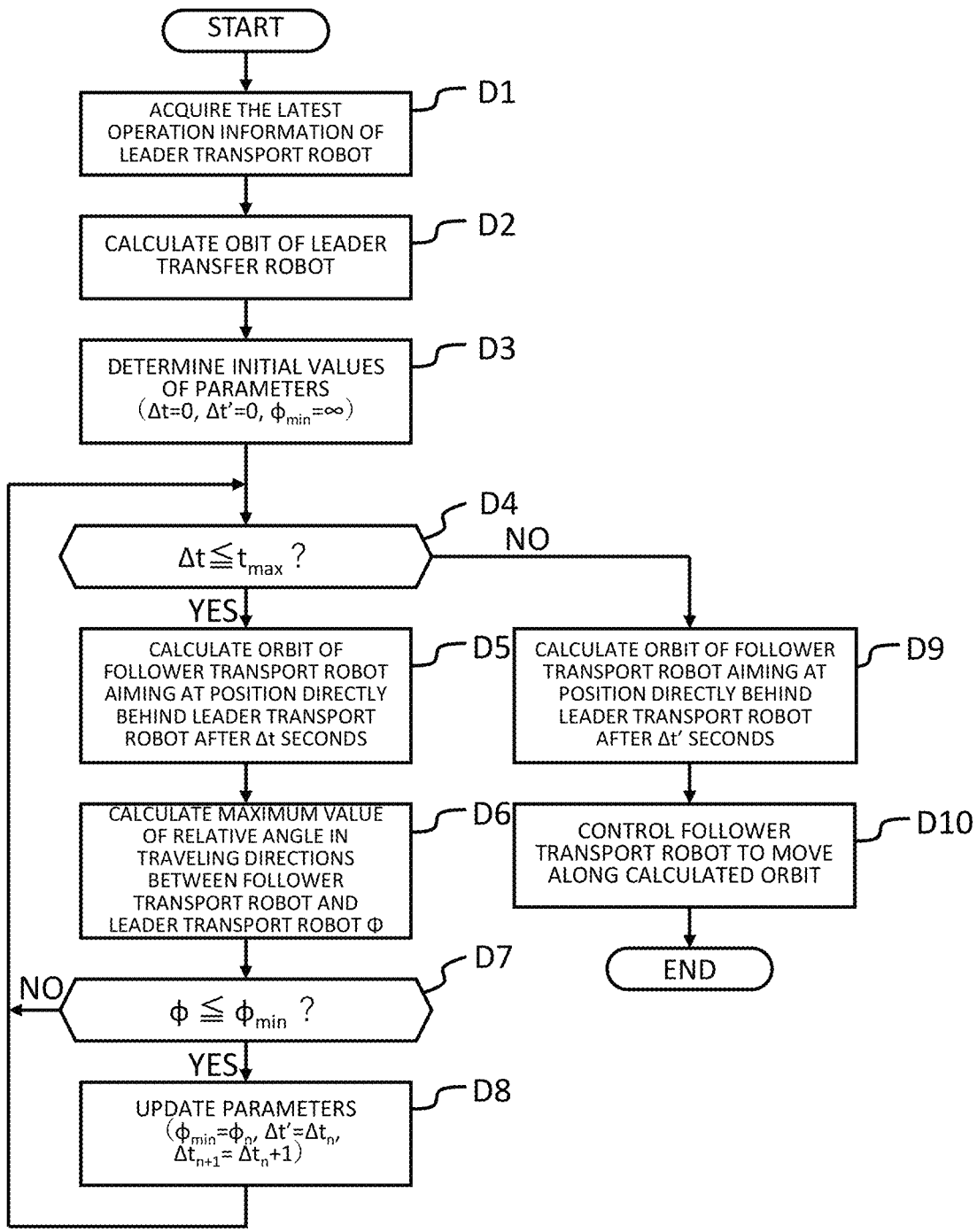
FIG. 27 is a flowchart schematically showing an operation when the control apparatus in the transport system according to the second exemplary embodiment controls the follower transport robot.

Next, an operation when the control apparatus in the transport system according to the second exemplary embodiment controls the follower transport robot will be described with reference to drawings. FIG. 27 is a flowchart schematically showing an operation when the control apparatus in the transport system according to the second exemplary embodiment controls the follower transport robot. Please refer to FIGS. 23 and 24 as to the configuration of the transport system 1.

First, the leader transport robot orbit calculation part 56a of the control apparatus 3 acquires the latest information (latest operation information of the leader transport robot 2A) of a current location (for example, position coordinate), a direction (for example, traveling direction), and control amounts (for example, rotation velocities) of the drive parts 12 and 13 of the left and right wheels 20 and 21 of the leader transport robot 2A (step D1). Here, the information of the current location and the direction of the leader transport robot 2A can be acquired from the robot position acquisition apparatus 4 or the leader transport robot 2A, and the information of the control amounts of the drive parts 12 and 13 can be acquired from the control part 56 of the control apparatus 3 that controls the leader transport robot 2A, or the leader transport robot 2A.

Next, the leader transport robot orbit calculation part 56a of the control apparatus 3 calculates (predicts) an orbit (future orbit) of the leader transport robot 2A based on the acquired latest operation information of the leader transport robot 2A (step). D2).

Next, the parameter determination part 56b of the control apparatus 3 determines initial values ($\Delta t=0$, $\Delta t'=0$, $\phi_{min}=\infty$) of parameters for calculating (predicting) an orbit (future orbit) of the follower transport robot 2B (step D3).

Here, $\Delta t$ is an elapsed time period from a time point of a current location of the leader transport robot 2A or the follower transport robot 2B, which is determined or updated by the parameter determination part 56b. $\Delta t'$ is a $\Delta t$ (elapsed time period from a time point of a current location of the leader transport robot 2A or the follower transport robot 2B) when maximum values of a relative angle in traveling directions between the leader transport robot 2A and the follower transport robot 2B, which is determined or updated by the parameter determination part 56b, become minimum. $\phi_{min}$ is a relative angle when maximum values of a relative angle in traveling directions between the leader transport robot 2A and the follower transport robot 2B, which is determined or updated by the parameter determination part 56b, becomes a minimum.

After step D3, when $\phi$ is greater than $\phi_{min}$ (NO in step D7), or after step D8, the parameter determination part 56b of the control apparatus 3 determines whether or not the latest $\Delta t$ is a preset $t_{max}$ or less (step D4). When $\Delta t$ is greater than $t_{max}$ (NO in step D4), the process proceeds to step D9.

Here, $\Delta t$ is the latest $\Delta t$, and when an initial value 0 is the latest, the initial value 0 is used, and when $\Delta t$ is updated, the updated latest $\Delta t$ is used.

When Δt is $t_{max}$ or less (YES in step D4), the follower transport robot orbit calculation part 56c of the control apparatus 3 calculates (predicts) an orbit (future orbit) of the follower transport robot 2B when the follower transport robot 2B moves toward a position directly behind the leader transport robot 2A after Δt from a time point of a current location based on the orbit of the leader transport robot 2A calculated by the leader transport robot orbit calculation part 56a and the latest Δt determined (or updated) by the parameter determination part 56b (step D5). Here, the orbit of the trailing transport robot 2B is an orbit so that the follower transport robot 2B presses (pushes) from outside of an orbit of the leader transport robot 2A and the follower transport robot 2B aims at a position directly behind the leader transport robot 2A.

Next, the relative angle calculation part 56d of the control apparatus 3 calculates (predicts) a maximum value ϕ of a relative angle in traveling directions between the leader transport robot 2A and the follower transport robot 2B based on the orbit of the leader transport robot 2A calculated by the leader transport robot orbit calculation part 56a, and the latest orbit of the follower transport robot 2B calculated by the follower transport robot orbit calculation part 56c (step D6).

Next, the parameter determination part 56b of the control apparatus 3 determines whether or not the latest maximum value ϕ of a relative angle in traveling directions between the leader transport robot 2A and the follower transport robot 2B calculated by a relative angle calculation part 56d is the latest determined or updated $ϕ_{min}$ or less (step D7). When ϕ is larger than $ϕ_{min}$ (NO in step D7), the process returns to step D4.

Here, $ϕ_{min}$ is the latest $ϕ_{min}$; when an initial value ∞ is the latest, the initial value ∞ is used; and when $ϕ_{min}$ is updated, the updated latest $ϕ_{min}$ is used.

When ϕ is $ϕ_{min}$ or less (YES in step D7), the parameter determination part 56b of the control apparatus 3 updates values of parameters ($ϕ_{min}$, Δt', Δt) for calculating (predicting) an orbit (future orbit) of the follower transport robot 2B (step D8), and then the process returns to step D4.

That is, in step D8, $ϕ_{min}$ is updated to the latest $ϕ_n$; Δt is updated to the latest $Δt_n$ plus a predetermined value (for example, 1 second), and Δt' is updated to the latest $Δt_n$. For example, in the first update, $ϕ_{min}=ϕ_0$, $Δt'=Δt_0=0$, $Δt_1=Δt_0+1=1$; and in the second update, $ϕ_{min}=ϕ_1$, $Δt'=Δt_1=1$, $Δt_2=Δt_1+1=2$; and they are updated in subsequent cases similarly.

When Δt is larger than $t_{max}$ (NO in step D4), the follower transport robot orbit calculation part 56c of the control apparatus 3 calculates (predicts) an orbit (future orbit) of the follower transport robot 2B when the follower transport robot 2B moves toward a position directly behind the leader transport robot 2A after the Δt' of a time point of the current location based on the orbit of the leader transport robot 2A calculated by the leader transport robot orbit calculation part 56a and the latest Δt' updated by the parameter determination part 56b (step D9).

Next, the follower transport robot control part 56e of the control apparatus 3 controls the drive parts 12 and 13 of the follower transport robot 2B so as to move along the orbit of the follower transport robot 2B calculated by the follower transport robot orbit calculation part 56c (step D10), and then ends one control loop and returns to the start for executing a next control loop.

In FIG. 27, although a control is performed regardless of curve or straight, the control may be started when the leader transport robot 2A comes to a curve entrance or immediately before the curve, and be ended at a curve exit or immediately after the curve. By controlling only during the curve, there is a time interval, so blurring can be reduced, and amounts of calculation and communication can be reduced.

According to the second exemplary embodiment, as the first exemplary embodiment, it is possible to contribute to stable transportation of the transport object as it is without modifying various types of transport object and without reloading the transport object. In particular, by controlling the follower transport robot 2B so as to push the transport object 5 from outside of an orbit of the leader transport robot 2A, the transport object 5 can be stably transported. Also, by controlling the transport robots 2A and 2B by the control apparatus 3, burdens of information processing on the transport robots 2A and 2B are reduced, and an operation can be performed for a long time.

Third Exemplary Embodiment

Figure 28:
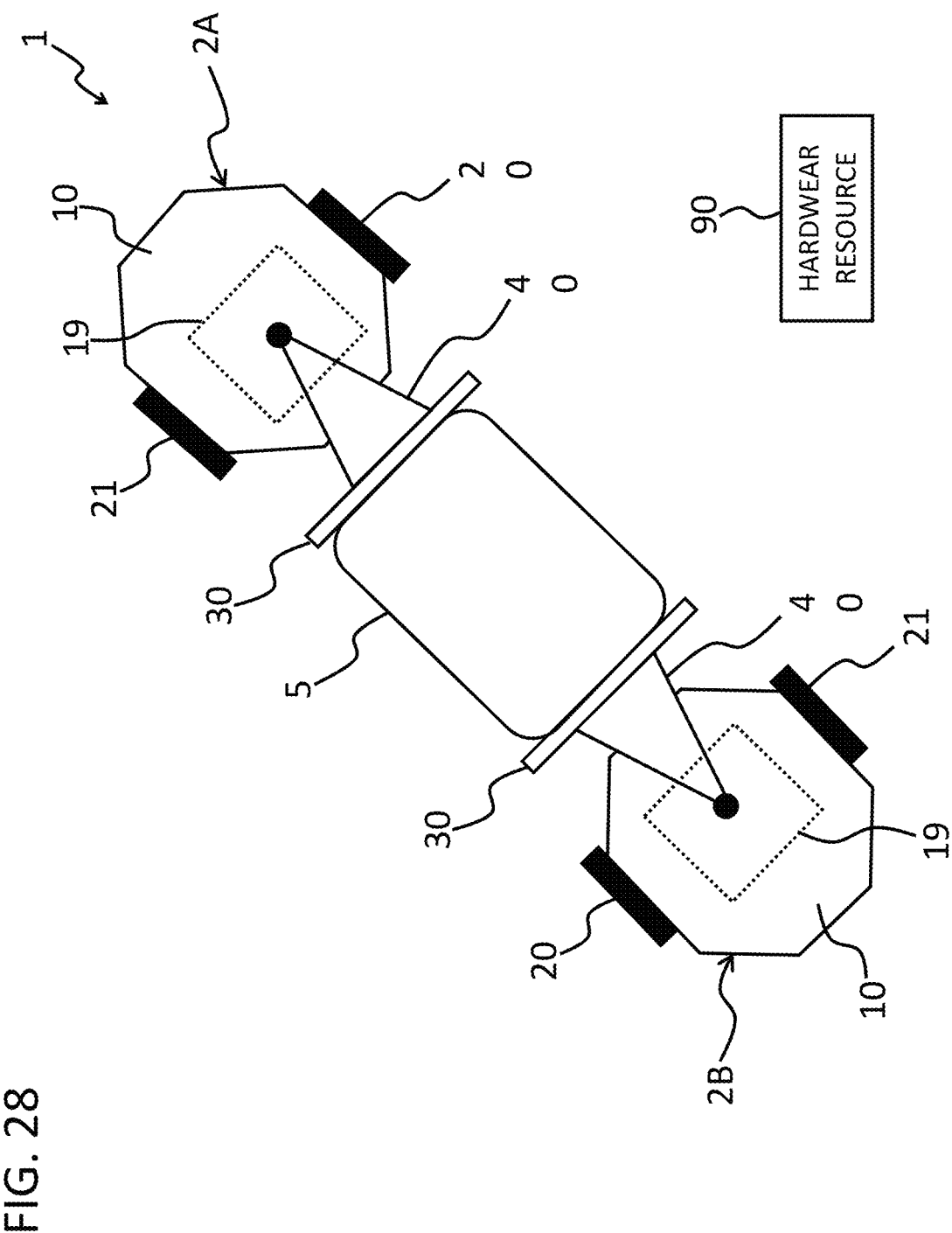
FIG. 28 is a block diagram schematically showing a configuration of a transport system according to a third exemplary embodiment.

A transport system according to a third exemplary embodiment will be described with reference to drawings. FIG. 28 is a block diagram schematically showing a configuration of the transport system according to the third exemplary embodiment.

The transport system 1 is a system in which a transport object 5 is sandwiched between two transport robots 2A and 2B, and the two transport robots 2A and 2B cooperate with each other to transport the transport object 5.

The transport robots 2A and 2B comprise: a main body 10; wheels 20 and 21; a drive part(s) 19 mounted on the main body 10 and configured to drive the wheels 20 and 21; a contact part 30 that contacts the transport object 5; and a rotation mechanism 40 that makes the contact part 30 rotatable relative to the main body 10.

The transport system 1, using hardware resource(s) 90, executes processings of: predicting an orbit of a first transport robot 2A of the two transport robots 2A and 2B, the first transport robot being arranged so that the contact part 30 contacts a front of the transport object 5 in a traveling direction at the time of transportation; and predicting an orbit of a second transport robot 2B of the two transport robots 2A and 2B, so that the second transport robot 2B pushes the transport object 5 from outside of the orbit of the first transport robot 2A in a curve, based on the predicted orbit of the first transport robot 2A, the second transport robot 2B being arranged so that the contact part 30 contacts a rear of the transport object 5 in a traveling direction at the time of transportation.

According to the third exemplary embodiment, as the first exemplary embodiment, it is possible to contribute to stable transportation of the transport object as it is without modifying various types of transport object and without reloading the transport object. In particular, by controlling the second transport robot 2B so as to push the transport object 5 from outside of an orbit of the first transport robot 2A, the transport object 5 can be stably transported.

The control part and the communication part of the transport robot according to the first exemplary embodiment, the control apparatus according to the second exemplary embodiment, and a part of the transport robot according to the first exemplary embodiment are configured of so-called information processing apparatus (computer, hardware resources). It is possible to use one comprising a configuration exemplarily shown in FIG. 29. For example, the information processing apparatus 100 comprises: a processor 101; a memory 102; a network interface 103; and the like, which are connected to each other by an internal bus 104.

Figure 29:
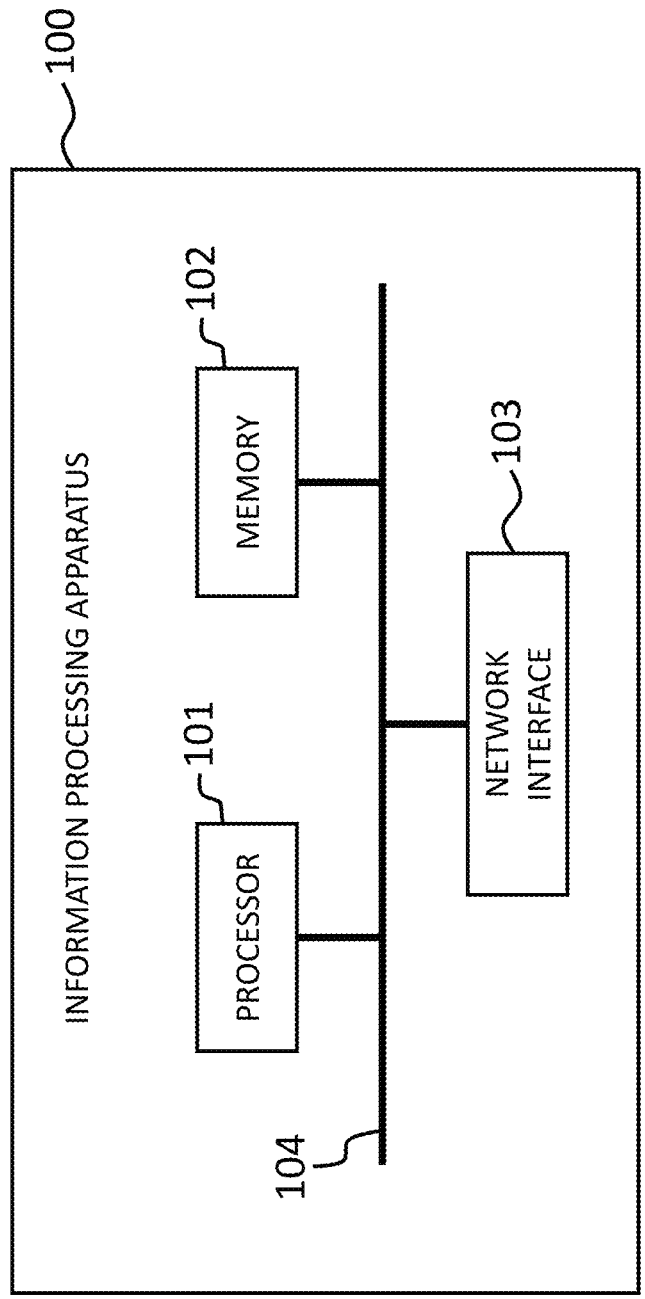
FIG. 29 is a block diagram schematically showing a configuration of an information processing apparatus.

Note that the configuration shown in FIG. 29 is not intended to limit a hardware configuration of the information processing apparatus 100. The information processing apparatus 100 may include hardware(s) (for example, an input/output interface) not shown. Alternatively, the number of units such as the processor 101 included in the information processing apparatus 100 is not limited to the example shown in FIG. 29, and for example, a plurality of processors 101 may be included in the information processing apparatus 100.

As the processor 101, for example, a CPU (Central Processing Unit), an MPU (Micro Processor Unit), or the like can be used.

As the memory 102, for example, a RAM (Random Access Memory), a ROM (Read Only Memory), an HDD (Hard Disk Drive), an SSD (Solid State Drive), or the like can be used.

As the network interface 103, for example, a LAN (Local Area Network) card, a network adapter, a network interface card, or the like can be used.

A function of the information processing apparatus 100 is realized by the above-mentioned processing module. The processing module is realized, for example, by the processor 101 executing a program stored in the memory 102. Also, the program can be downloaded via a network or updated using a storage medium in which the program is stored. Further, the processing module may be realized by a semiconductor chip. That is, a function performed by the processing module may be realized by executing software on certain hardware.

Part or all of the above exemplary embodiment may be described as in the following modes, but is not limited to the following.

[Mode 1]
In the present invention, a Mode of the transport system according to the first aspect is possible.

[Mode 2]
The transport system according to Mode 1,
wherein the predicting the orbit of the second transport robot comprises predicting the orbit of the second transport robot when moving toward a position directly behind the first transport robot after a plurality of arbitrary time periods from a time point of a current location have elapsed, and
wherein using the hardware resources, after the predicting the orbit of the second transport robot, the following processings are executed, the following processings comprising:
calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and
controlling the drive part(s) of the second transport robot based on the calculated orbit of the second transport robot.

[Mode 3]
The transport system according to Mode 2,
wherein using the hardware resources, after predicting the orbit of the second transport robot, the following processings are executed:
calculating maximum values of a relative angle in traveling directions between the first transport robot and the second transport robot for each of the arbitrary time periods based on the predicted orbit of the first transport robot and the predicted orbit of the second transport robot; and determining a time period at which the maximum value of the calculated relative angle becomes a minimum, or a shortest time period becoming a preset threshold value or less, among the arbitrary time periods, and
wherein the calculating the orbit of the second transport robot comprises calculating the orbit of the second transport robot when the second transport robot moves toward a position directly behind the first transport robot after the determined time period has elapsed from the time point of the current location, while pushing the transport object from outside of the orbit of the first transport robot in a curve, based on the predicted orbit of the first transport robot and the determined time period.

[Mode 4]
The transport system according to any one of Modes 1 to 3, wherein the position directly behind the first transport robot is a position on a virtual line in a traveling direction of the first transport robot passing through a center-of-gravity of the first transport robot.

[Mode 5]
The transport system according to any one of Modes 1 to 4, wherein the arbitrary time period is a plurality of time periods having a predetermined time period difference.

[Mode 6]
The transport system according to any one of Modes 1 to 5, wherein the second transport robot further comprises a control part that executes each of the above processings as the hardware resources.

[Mode 7]
The transport system according to Mode 6,
wherein the control part executes acquiring information of a current location, a direction of the first transport robot and a control amount(s) of the drive part(s) of the first transport robot from the first transport robot, and
wherein the predicting the orbit of the first transport robot comprises predicting the orbit of the first transport robot based on the current location and the direction of the first transport robot and the control amount(s) of the drive part(s) of the first transport robot as acquired.

[Mode 8]
The transport system according to any one of Modes 1 to 5, wherein the transport system further comprises as the hardware resources a control apparatus that controls the first transport robot and the second transport robot, and the control apparatus executes each of the processings.

[Mode 9]
The transport system according to Mode 8,
wherein the transport system further comprises a robot position acquisition apparatus that acquires information of positions of the first transport robot and the second transport robot,
wherein the control apparatus acquires information of a current location and a direction of the first transport robot from the robot position acquisition apparatus, and acquires information of a control amount(s) of the drive part(s) of the first transport robot calculated by itself, and
wherein the predicting the orbit of the first transport robot comprises predicting the orbit of the first transport robot based on the current location and the direction of the first transport robot and the control amount(s) of the drive part(s) of the first transport robot, as acquired.

[Mode 10]
The transport system according to any one of Modes 1 to 9, wherein in controlling the drive part(s) of the second transport robot, the drive part(s) of the second transport robot is controlled so that the second transport robot moves while pushing the first robot together with the transport object.

[Mode 11]
The transport system according to any one of Modes 1 to 10, wherein each of the processings is started when the first transport robot comes to a curve entrance or just before the curve, and ends when the second transport robot comes to a curve exit or just after the curve.

[Mode 12]
In the present invention, a Mode of the transport robot according to the second aspect is possible.

[Mode 13]
The transport robot according to Mode 12,
wherein the predicting the orbit of the second transport robot comprises predicting the orbit of the second transport robot when moving toward a position directly behind the first transport robot after a plurality of arbitrary time periods from a time point of a current location have elapsed, and
wherein after the predicting the orbit of the second transport robot, the control part is configured to execute processings of:
calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and
controlling the drive part(s) of the second transport robot based on the calculated orbit of the second transport robot.

[Mode 14]
The transport robot according to Mode 13, wherein after the predicting the orbit of the second transport robot, the control part is configured to execute processings of:
calculating maximum values of a relative angle in traveling directions between the first transport robot and the second transport robot for each of the arbitrary time periods based on the predicted orbit of the first transport robot and the predicted orbit of the second transport robot; and
determining a time period at which the maximum value of the calculated relative angle becomes a minimum, or a shortest time period becoming a preset threshold value or less, among the arbitrary time periods, and
wherein the calculating the orbit of the second transport robot comprises calculating the orbit of the second transport robot when the second transport robot moves toward a position directly behind the first transport robot after the determined time period has elapsed from the time point of the current location, while pushing the transport object from outside of the orbit of the first transport robot in a curve, based on the predicted orbit of the first transport robot and the determined time period.

[Mode 15]
In the present invention, a Mode of the control apparatus according to the third aspect is possible.

[Mode 16]
The control apparatus according to Mode 15,
wherein the predicting the orbit of the second transport robot comprises predicting the orbit of the second transport robot when moving toward a position directly behind the first transport robot after a plurality of arbitrary time periods from a time point of a current location have elapsed, and
wherein after the predicting the orbit of the second transport robot, the control apparatus is configured to execute processings of:
calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and
controlling the drive part(s) of the second transport robot based on the calculated orbit of the second transport robot.

[Mode 17]
The control apparatus according to Mode 16,
wherein after the predicting the orbit of the second transport robot, the control apparatus is configured to execute processings of:
calculating maximum values of a relative angle in traveling directions between the first transport robot and the second transport robot for each of the arbitrary time periods based on the predicted orbit of the first transport robot and the predicted orbit of the second transport robot; and
determining a time period at which the maximum value of the calculated relative angle becomes a minimum, or a shortest time period becoming a preset threshold value or less, among the arbitrary time periods, and
wherein the calculating the orbit of the second transport robot comprises calculating the orbit of the second transport robot when the second transport robot moves toward a position directly behind the first transport robot after the determined time period has elapsed from the time point of the current location, while pushing the transport object from outside of the orbit of the first transport robot in a curve, based on the predicted orbit of the first transport robot and the determined time period.

[Mode 18]
In the present invention, a Mode of the control method of the transport robot according to the fourth aspect is possible.

[Mode 19]
The control method of the transport robot according to Mode 18,
wherein the predicting the orbit of the second transport robot comprises predicting the orbit of the second transport robot when moving toward a position directly behind the first transport robot after a plurality of arbitrary time periods from a time point of a current location have elapsed, and
wherein after the predicting the orbit of the second transport robot, the control method of the transport robot further comprises:
calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and
controlling the drive part(s) of the second transport robot based on the calculated orbit of the second transport robot.

[Mode 20]
The control method of the transport robot according to Mode 19,
wherein after the predicting the orbit of the second transport robot, the control method of the transport robot further comprises:
calculating maximum values of a relative angle in traveling directions between the first transport robot and the second transport robot for each of the arbitrary time periods based on the predicted orbit of the first transport robot and the predicted orbit of the second transport robot; and
determining a time period at which the maximum value of the calculated relative angle becomes a minimum, or a shortest time period becoming a preset threshold value or less, among the arbitrary time periods, and wherein the calculating the orbit of the second transport robot comprises calculating the orbit of the second transport robot when the second transport robot moves toward a position directly behind the first transport robot after the determined time period has elapsed from the time point of the current location, while pushing the transport object from outside of the orbit of the first transport robot in a curve, based on the predicted orbit of the first transport robot and the determined time period.

[Mode 21]

In the present invention, a Mode of the program according to the fifth aspect is possible.

[Mode 22]

The program according to Mode 21, wherein the predicting the orbit of the second transport robot comprises predicting the orbit of the second transport robot when moving toward a position directly behind the first transport robot after a plurality of arbitrary time periods from a time point of a current location have elapsed, and wherein after the predicting the orbit of the second transport robot, the program further causes the control part to execute:

calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and controlling the drive part(s) of the second transport robot based on the calculated orbit of the second transport robot.

[Mode 23]

The program according to Mode 22, wherein after the predicting the orbit of the second transport robot, the program further causes the control part to execute:

calculating maximum values of a relative angle in traveling directions between the first transport robot and the second transport robot for each of the arbitrary time periods based on the predicted orbit of the first transport robot and the predicted orbit of the second transport robot; and determining a time period at which the maximum value of the calculated relative angle becomes a minimum, or a shortest time period becoming a preset threshold value or less, among the arbitrary time periods, and wherein the calculating the orbit of the second transport robot comprises calculating the orbit of the second transport robot when the second transport robot moves toward a position directly behind the first transport robot after the determined time period has elapsed from the time point of the current location, while pushing the transport object from outside of the orbit of the first transport robot in a curve, based on the predicted orbit of the first transport robot and the determined time period.

[Mode 24]

In the present invention, a Mode of the program according to the sixth aspect is possible.

[Mode 25]

The program according to Mode 24, wherein the predicting the orbit of the second transport robot comprises predicting the orbit of the second transport robot when moving toward a position directly behind the first transport robot after a plurality of arbitrary time periods from a time point of a current location have elapsed, and wherein after the predicting the orbit of the second transport robot, the program further causes the control apparatus to execute:

calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and controlling the drive part(s) of the second transport robot based on the calculated orbit of the second transport robot.

[Mode 26]

The program according to Mode 25, wherein after the predicting the orbit of the second transport robot, the program further causes the control apparatus to execute:

calculating maximum values of a relative angle in traveling directions between the first transport robot and the second transport robot for each of the arbitrary time periods based on the predicted orbit of the first transport robot and the predicted orbit of the second transport robot; and determining a time period at which the maximum value of the calculated relative angle becomes a minimum, or a shortest time period becoming a preset threshold value or less, among the arbitrary time periods, and wherein the calculating the orbit of the second transport robot comprises calculating the orbit of the second transport robot when the second transport robot moves toward a position directly behind the first transport robot after the determined time period has elapsed from the time point of the current location, while pushing the transport object from outside of the orbit of the first transport robot in a curve, based on the predicted orbit of the first transport robot and the determined time period.

It should be noted that each disclosure of the above PTLs shall be incorporated and described herein by reference and can be used as a basis or a part of the present invention as necessary. Within a framework of the entire disclosure of the present invention (including claims and drawings), it is possible to modify or adjust the exemplary embodiments or examples based on the basic technical idea thereof. Also, within the framework of entire disclosure of the present invention, various combinations or selections (non-selection if necessary) of various disclosed elements (including each element of each claim, each element of each exemplary embodiment or example, each element of each drawing, etc.) is possible. That is, it goes without saying that the present invention includes various modifications and modifications that can be made by one skilled in the art in accordance with all disclosures including claims and drawings, and the technical concept. Further, as to the numerical values and numerical ranges described in the present application, it is considered that arbitrary intermediate values, lower numerical values, and small ranges are described even if not explicitly recited. Furthermore, it is also considered that a matter used to combine part or all of each of the disclosed matters of the above-cited documents with the matters described in this document as a part of the disclosure of the present invention, in accordance with the gist of the present invention, if necessary, is included in the disclosed matters of the present application.

REFERENCE SIGNS LIST

1 Transport system
2 Transport robot

2A Leader transport robot (first transport robot)
2B Follower transport robot (second transport robot)
3 Control apparatus
4 Robot position acquisition apparatus
5 Transport object
6 Freight
10 Main body
11 Frame
12, 13, 19 Drive part
14, 15 Shaft
16, 56 Control part
16a Leader transport robot orbit calculation part
16b Parameter determination part
16c Follower transport robot orbit calculation part
16d Relative angle calculation part
16e Drive control part
17, 57 Communication part
18 Position detection part
20, 21 Wheel
22 Caster
30 Contact part
31 Plate member
32 Friction part
40 Rotation mechanism
41 Arm
42 Shaft part
56a Leader transport robot orbit calculation part
56b Parameter determination part
56c Follower transport robot orbit calculation part
56d Relative angle calculation part
56e Follower transport robot control part
70 Pedestal
71, 72, 73, 74 Caster
80 Floor
81 Axis
82, 83, 85, 86 Orbit
84 Virtual line
90 Hardware resources
100 Information processing apparatus
101 Processor
102 Memory
103 Network interface
104 Internal bus

What is claimed is:

1. A transport system that transports a transport object in a state sandwiching the transport object between two transport robots,
wherein the transport robot comprises:
a main body
wheels;
a drive part(s) mounted on the main body and configured to drive the wheels;
a contact part that contacts the transport object; and
a rotation mechanism that makes the contact part rotatable relative to the main body,
wherein using hardware resources, the following processings are executed, the processings comprising:
predicting an orbit of a first transport robot of the two transport robots, the first transport robot being arranged so that the contact part contacts a front of the transport object in a traveling direction at the time of transportation; and
predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

2. The transport system according to claim 1,
wherein the predicting the orbit of the second transport robot comprises predicting the orbit of the second transport robot when moving toward a position directly behind the first transport robot after a plurality of arbitrary time periods from a time point of a current location have elapsed, and
wherein using the hardware resources, after the predicting the orbit of the second transport robot, the following processings are executed, the following processings comprising:
calculating an orbit of the second transport robot when the second transport robot moves toward a position directly behind the first transport robot after any one of the arbitrary time periods from the time point of the current location has elapsed, while pushing the transport object from outside of the orbit of the first transport robot in the curve, based on the predicted orbit of the first transport robot and any one of the arbitrary time periods; and
controlling the drive part(s) of the second transport robot based on the calculated orbit of the second transport robot.

3. The transport system according to claim 2,
wherein using the hardware resources, after predicting the orbit of the second transport robot, the following processings are executed:
calculating maximum values of a relative angle in traveling directions between the first transport robot and the second transport robot for each of the arbitrary time periods based on the predicted orbit of the first transport robot and the predicted orbit of the second transport robot; and
determining a time period at which the maximum value of the calculated relative angle becomes a minimum, or a shortest time period becoming a preset threshold value or less, among the arbitrary time periods, and
wherein the calculating the orbit of the second transport robot comprises calculating the orbit of the second transport robot when the second transport robot moves toward a position directly behind the first transport robot after the determined time period has elapsed from the time point of the current location, while pushing the transport object from outside of the orbit of the first transport robot in a curve, based on the predicted orbit of the first transport robot and the determined time period.

4. The transport system according to claim 3, wherein the second transport robot further comprises a control part that executes each of the processings as the hardware resources.

5. The transport system according to claim 3, wherein the transport system further comprises as the hardware resources a control apparatus that controls the first transport robot and the second transport robot, and
the control apparatus executes each of the processings.

6. The transport system according to claim 3, wherein the position directly behind the first transport robot is a position on a virtual line in a traveling direction of the first transport robot passing through a center-of-gravity of the first transport robot.

7. The transport system according to claim 2, wherein the second transport robot further comprises a control part that executes each of the processings as the hardware resources.

8. The transport system according to claim 2, wherein the transport system further comprises as the hardware resources a control apparatus that controls the first transport robot and the second transport robot, and
the control apparatus executes each of the processings.

9. The transport system according to claim 2, wherein the position directly behind the first transport robot is a position on a virtual line in a traveling direction of the first transport robot passing through a center-of-gravity of the first transport robot.

10. The transport system according to claim 2, wherein the arbitrary time period is a plurality of time periods having a predetermined time period difference.

11. The transport system according to claim 1, wherein the second transport robot further comprises a control part that executes each of the processings as the hardware resources.

12. The transport system according to claim 11,
wherein the control part executes acquiring information of a current location, a direction of the first transport robot and a control amount(s) of the drive part(s) of the first transport robot from the first transport robot, and
wherein the predicting the orbit of the first transport robot comprises predicting the orbit of the first transport robot based on the current location and the direction of the first transport robot and the control amount(s) of the drive part(s) of the first transport robot as acquired.

13. The transport system according to claim 1,
wherein the transport system further comprises as the hardware resources a control apparatus that controls the first transport robot and the second transport robot, and
the control apparatus executes each of the processings.

14. The transport system according to claim 13,
wherein the transport system further comprises a robot position acquisition apparatus that acquires information of positions of the first transport robot and the second transport robot,
wherein the control apparatus acquires information of a current location and a direction of the first transport robot from the robot position acquisition apparatus, and acquires information of a control amount(s) of the drive part(s) of the first transport robot calculated by itself, and
wherein the predicting the orbit of the first transport robot comprises predicting the orbit of the first transport robot based on the current location and the direction of the first transport robot and the control amount(s) of the drive part(s) of the first transport robot, as acquired.

15. The transport system according to claim 1, wherein the position directly behind the first transport robot is a position on a virtual line in a traveling direction of the first transport robot passing through a center-of-gravity of the first transport robot.

16. The transport system according to claim 1, wherein the arbitrary time period is a plurality of time periods having a predetermined time period difference.

17. The transport system according to claim 1, wherein the second transport robot further comprises a control part that executes each of the above processings as the hardware resources.

18. The transport system according to claim 1, wherein the control part executes acquiring information of a current location, a direction of the first transport robot and a control amount(s) of the drive part(s) of the first transport robot from the first transport robot, and
wherein the predicting the orbit of the first transport robot comprises predicting the orbit of the first transport robot based on the current location and the direction of the first transport robot and the control amount(s) of the drive part(s) of the first transport robot as acquired.

19. A transport robot configured to transport a transport object while sandwiching the transport object by cooperating with another transport robot, the transport robot comprising:
a main body;
wheels;
a drive part(s) mounted on the main body and configured to drive the wheels;
a contact part that contacts the transport object;
a rotation mechanism that makes the contact part rotatable relative to the main body; and
a control part that controls the drive part(s),
wherein the control part executes:
predicting an orbit of a first transport robot of the two transport robots, the first transport robot being arranged so that the contact part contacts a front of the transport object in a traveling direction at the time of transportation; and
predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation.

20. A control method of transport robots that controls two transport robots adapted to sandwich a transport object in cooperation with each other to transport the transport object,
wherein the transport robot comprises:
a main body;
wheels;
a drive part(s) mounted on the main body and configured to drive the wheels;
a contact part that contacts the transport object; and
a rotation mechanism that makes the contact part rotatable relative to the main body,
wherein the control method of the transport robot comprises:
predicting an orbit of a first transport robot of the two transport robots, the first transport robot being arranged so that the contact part contacts a front of the transport object in a traveling direction at the time of transportation; and
predicting an orbit of a second transport robot of the two transport robots, so that the second transport robot pushes the transport object from outside of the orbit of the first transport robot in a curve, based on the predicted orbit of the first transport robot, the second transport robot being arranged so that the contact part contacts a rear of the transport object in a traveling direction at the time of transportation, and
wherein each of the processings is executed using hardware resources.

* * * * *